United States Patent
Yore et al.

(10) Patent No.: US 12,016,062 B2
(45) Date of Patent: *Jun. 18, 2024

(54) SYSTEMS AND METHODS FOR CONFIGURING A MEDIA PLAYER DEVICE ON A LOCAL NETWORK USING A GRAPHICAL USER INTERFACE

(71) Applicant: Sonos, Inc., Santa Barbara, CA (US)

(72) Inventors: Jason Yore, Santa Barbara, CA (US); William Shoesmith, Arlington, MA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/936,757

(22) Filed: Sep. 29, 2022

(65) Prior Publication Data

US 2023/0026035 A1 Jan. 26, 2023

Related U.S. Application Data

(63) Continuation of application No. 17/013,356, filed on Sep. 4, 2020, now Pat. No. 11,464,055.

(Continued)

(51) Int. Cl.
*H04W 76/10* (2018.01)
*G06F 3/0482* (2013.01)
(Continued)

(52) U.S. Cl.
CPC .......... *H04W 76/10* (2018.02); *G06F 3/0482* (2013.01); *H04L 12/28* (2013.01); *H04L 65/60* (2013.01);
(Continued)

(58) Field of Classification Search
CPC . H04L 12/28; H04L 12/2803; H04L 12/2814; H04L 41/12; H04L 65/60;
(Continued)

(56) References Cited

U.S. PATENT DOCUMENTS 8,234,395 B2 7/2012 Millington
8,483,853 B1 7/2013 Lambourne
(Continued)

OTHER PUBLICATIONS

Nelson, "Using Bluetooth for Wi-Fi Onboarding", Cirrent, Feb. 28, 2018, retrieved from https://blog.cirrent.com/using-bluetooth-for-wi-fi-onboarding, pp. 1-7.

*Primary Examiner* — Andrew L Tank
(74) *Attorney, Agent, or Firm* — Finch & Maloney PLLC

(57) ABSTRACT

Systems and methods for configuring a media playback device to connect to a local area network (LAN) and be controlled by a mobile device also configured to connect to the LAN are disclosed. In one embodiment, the method includes displaying screens on a graphical user interface on the mobile device indicating the status, scanning for Bluetooth low energy (BLE) devices using the mobile device, detecting a media playback device as a BLE device, connecting the mobile device to the media playback device using BLE, obtaining LAN connection information, configuring the media playback device to connect to the LAN using the BLE connection from the mobile device, and setting speaker configuration information for the media playback device using the graphical user interface.

10 Claims, 32 Drawing Sheets

Related U.S. Application Data

(60) Provisional application No. 62/895,942, filed on Sep. 4, 2019.

(51) Int. Cl.
  *H04L 12/28* (2006.01)
  *H04L 65/60* (2022.01)
  *H04W 4/80* (2018.01)
  *H04W 8/00* (2009.01)
  *G06F 3/16* (2006.01)
  *G08B 25/10* (2006.01)
  *H04L 41/12* (2022.01)
  *H04M 1/72412* (2021.01)

(52) U.S. Cl.
  CPC ............. *H04W 4/80* (2018.02); *H04W 8/005* (2013.01); *G06F 3/165* (2013.01); *G08B 25/10* (2013.01); *H04L 12/2803* (2013.01); *H04L 12/2814* (2013.01); *H04L 41/12* (2013.01); *H04M 1/72412* (2021.01)

(58) Field of Classification Search
  CPC ....... H04W 4/80; H04W 8/005; H04W 76/10; H04M 1/72409; H04M 1/72412; G08B 25/10; G06F 3/165; G06F 3/0482
  See application file for complete search history.

(56) References Cited

U.S. PATENT DOCUMENTS

| | | |
|---|---|---|
| 9,325,516 B2 | 4/2016 | Pera et al. |
| 9,528,861 B1 | 12/2016 | Haupt et al. |
| 9,806,900 B2 | 10/2017 | Jacobson et al. |
| 10,142,122 B1 | 11/2018 | Hill et al. |
| 11,464,055 B2 | 10/2022 | Yore et al. |
| 2013/0014232 A1 | 1/2013 | Louboutin et al. |
| 2016/0374133 A1 | 12/2016 | Logue et al. |
| 2017/0192739 A1 | 7/2017 | Gossain et al. |
| 2017/0242653 A1 | 8/2017 | Lang et al. |
| 2018/0107446 A1 | 4/2018 | Wilberding et al. |
| 2019/0149987 A1 | 5/2019 | Moore |
| 2019/0230408 A1 | 7/2019 | Borghei et al. |
| 2020/0077188 A1 | 3/2020 | D'amato et al. |
| 2021/0068173 A1 | 3/2021 | Yore et al. |

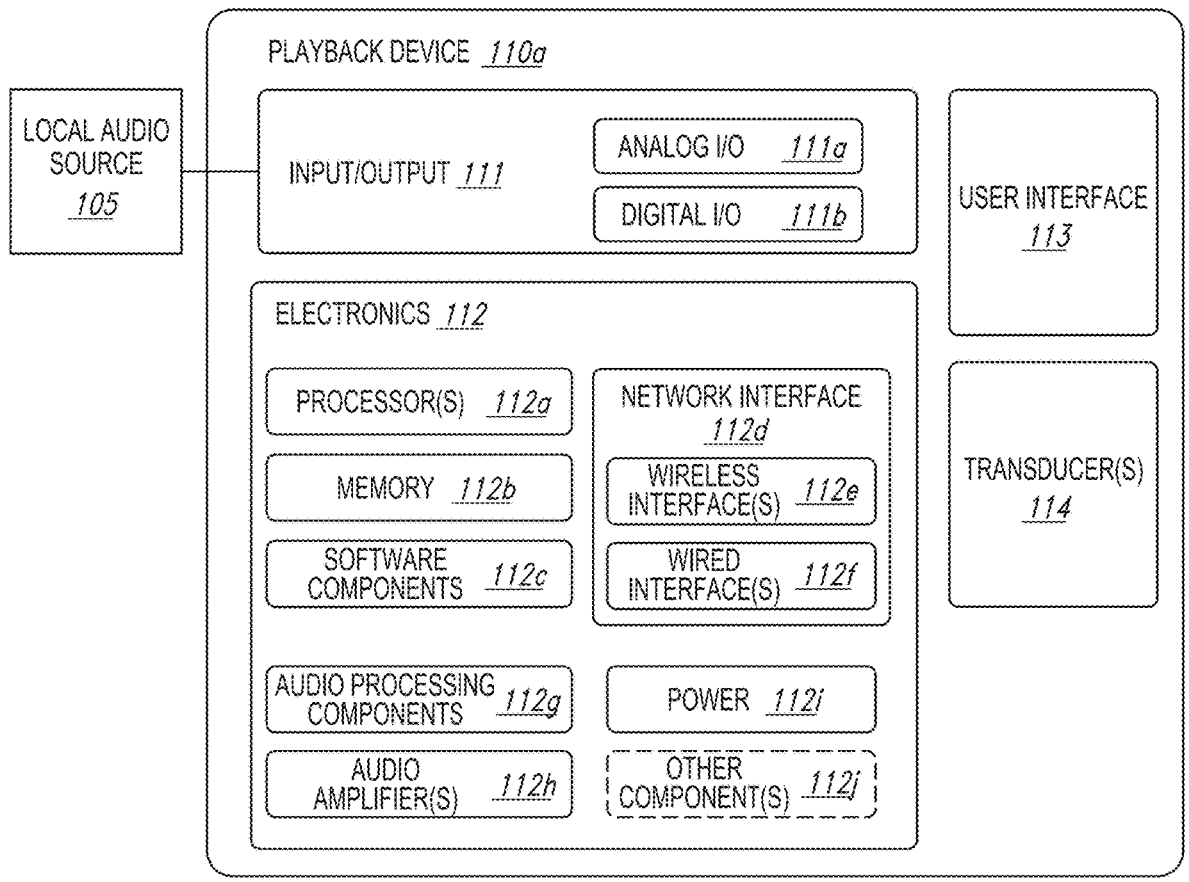
Fig. 1C
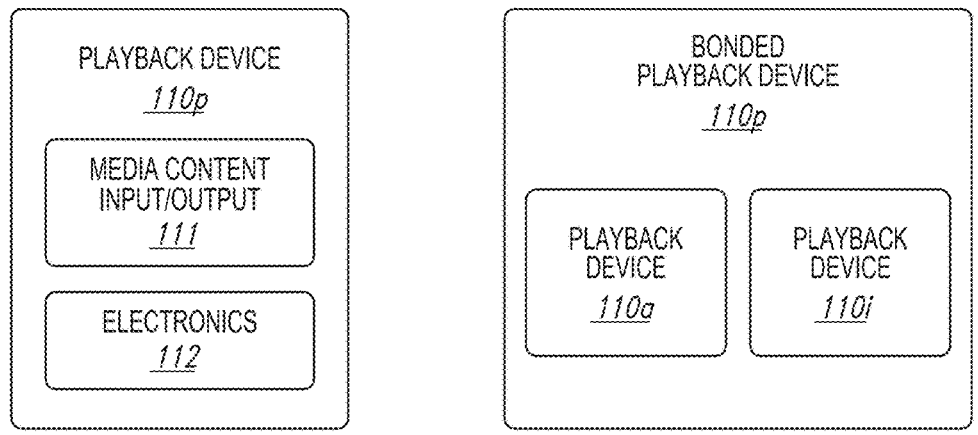
Fig. 1D
Fig. 1E

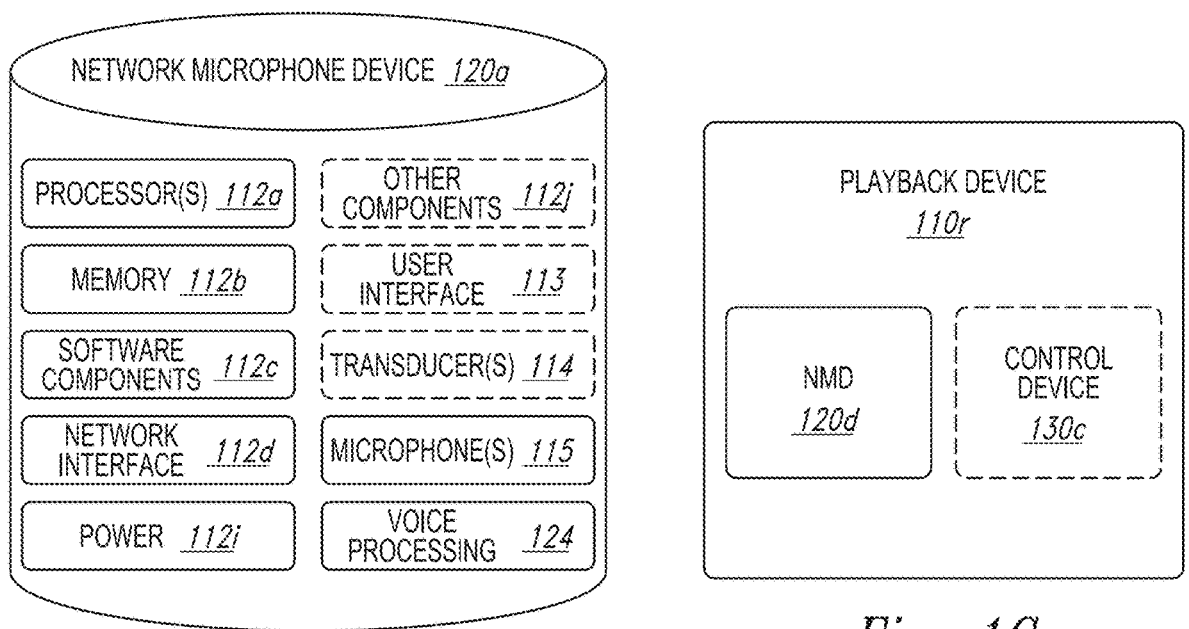
Fig. 1F
Fig. 1G
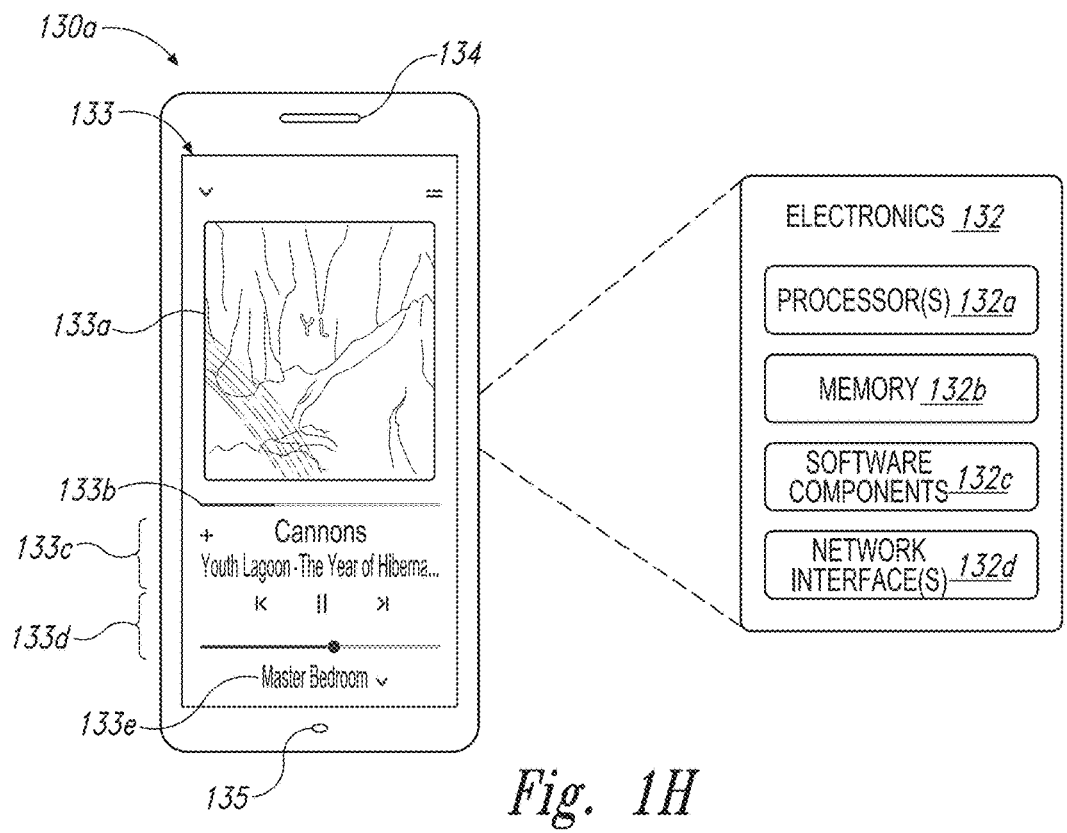
Fig. 1H

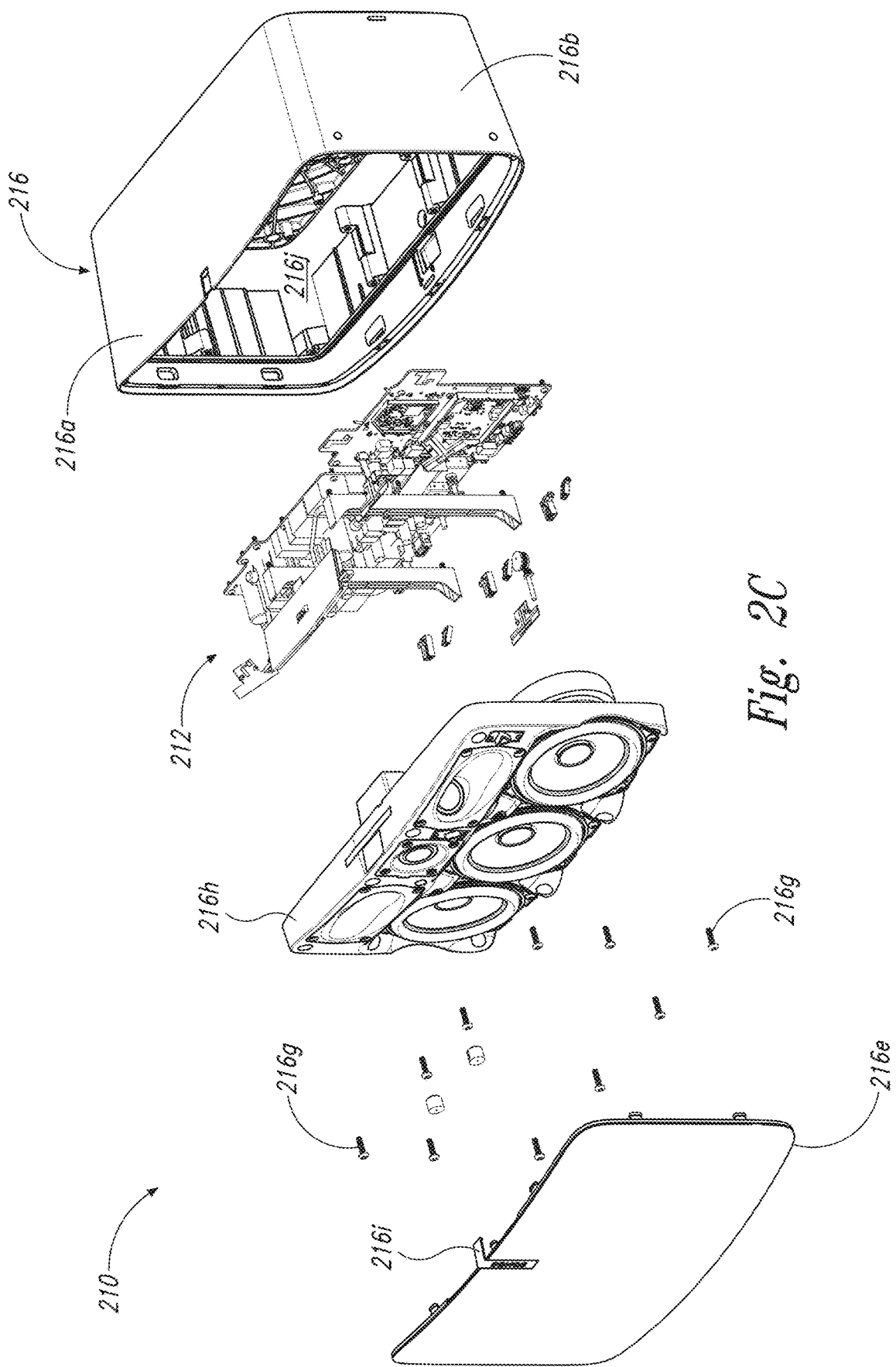

Press the button on your \<model\>

Press and release the button as shown below, and listen for the chime:

Next →

Player Setup

1. On your <model>, press and release the button as shown below:

2. Press "Next" to continue.

Is this the speaker you want to set up?

<model>, <color>

Serial Number:
<number>

Yes

Choose different speaker

Which one do you want to set up first?

We found <number> speakers.

<model>, <color>

Serial Number
00:00:00:00

● ◦

Set up this speaker

Choose different speaker

← Back

Which one do you want to set up first?

We found <number> speakers.

SOUNDBAR ▾

Serial Number
00:00:00:00

Set up this speaker

Choose different speaker

FIG. 17

<MODEL> added

Let's set it up.

Add another speaker

Not now

← Back

\<Model\> setup

How do you plan to use it? You can change it whenever you want.

In a new room

Left-Right stereo pair in existing room

Surround speaker for your home theater.

← Back

Choose a room for your <Model>

Room Name

Bathroom

Bedroom

Den

Dining Room

Family Room

Foyer

Garage

Garden

Guest Room

Patio

FIG. 20

← Back

How do you want to use \<model\>?

For music

As stereo speakers

For home theater and music

As front speakers

As surround speakers

You can always change this later in Settings.

SYSTEMS AND METHODS FOR CONFIGURING A MEDIA PLAYER DEVICE ON A LOCAL NETWORK USING A GRAPHICAL USER INTERFACE

CROSS REFERENCE TO RELATED APPLICATIONS

The current application is a continuation of U.S. patent application Ser. No. 17/013,356 entitled "Systems and Methods for Configuring a Media Player Device on a Local Network using a Graphical User Interface" to Yore et al., filed Sep. 4, 2020, which claims priority to U.S. Provisional Patent Application No. 62/895,942 entitled "Systems and Methods for Configuring a Media Player Device on a Local Network using a Graphical User Interface" to Yore et al., filed Sep. 4, 2019, the disclosures of which are incorporated herein by reference in their entirety.

FIELD OF THE DISCLOSURE

The present disclosure is related to consumer goods and, more particularly, to methods, systems, products, features, services, and other elements directed to media playback on media player devices on a local network or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY OF THE INVENTION

Systems and methods for configuring a media player device on a local network using a graphical user interface are disclosed.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 2C is an exploded view of the playback device of FIG. 2A.

FIG. 17 is an example graphical user interface screen of a network password prompt.

FIGS. 20 and 21 are example graphical user interface screens of a room name prompt.

Figure 1A:
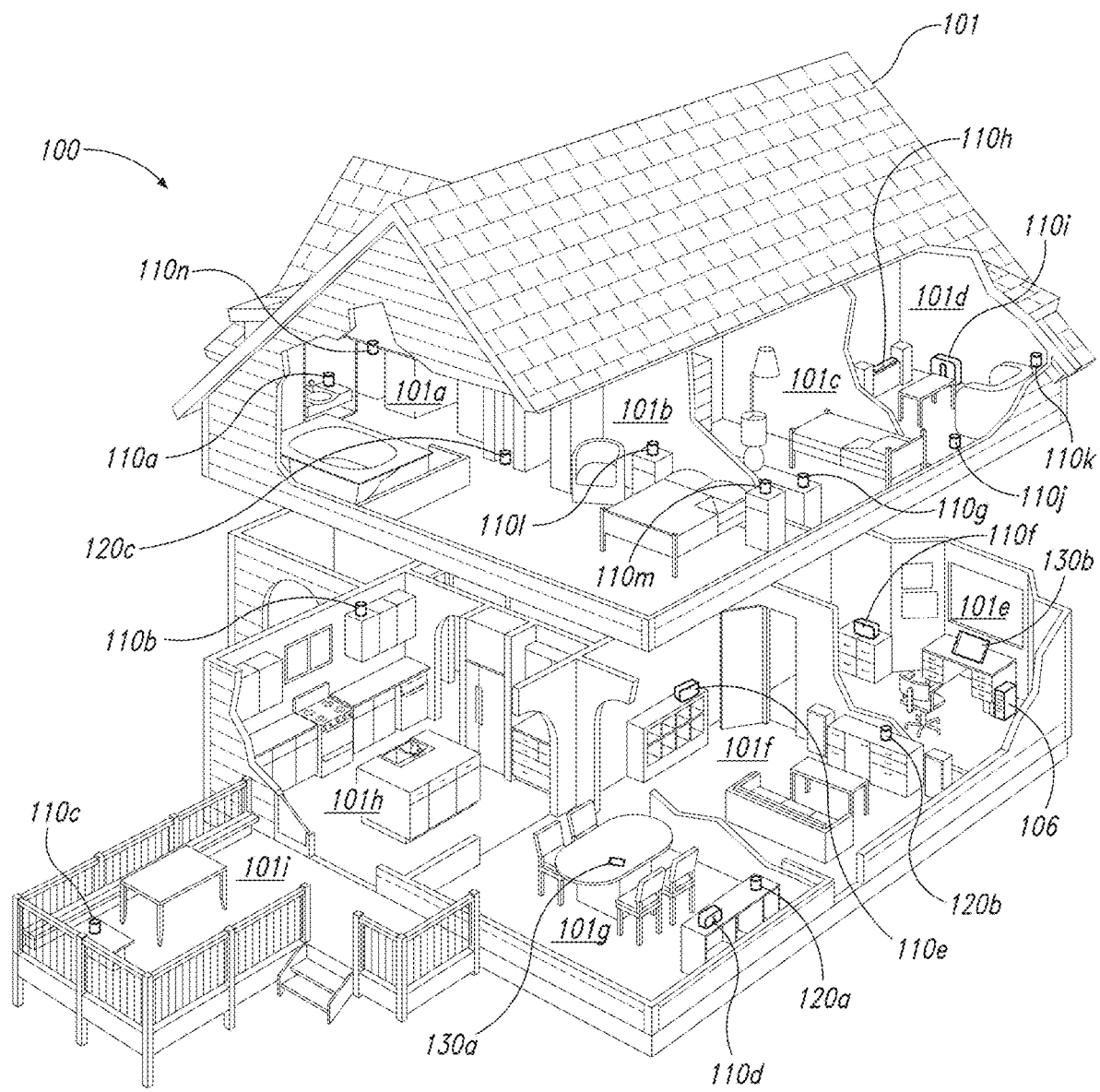
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to detection and configuration of a media player device in a network-connected playback system and providing information during the configuration on a graphical user interface of a mobile device.

In some embodiments, for example, a method of for detecting and configuration of a media player device in a playback system using a mobile device includes using one or more of a variety of network mechanisms or features on a wireless or wired network. In the discussion below, the media player device to be setup or configured may be referred to as a "target media player device." In some embodiments, the target media player device is a portable device, which may be connected to a constant power source (e.g., a wall outlet or power cable) and may be removed from the power source to run on battery power. A graphical user interface may be provided on the display screen of a mobile device for a user to interact with in setting up or configuring the target media player device. Such mobile device may include a processor and instructions for a setup mobile application. When the setup mobile application executes on the processor it can direct the processor to perform configuration steps, interacting with the display screen and/or other components such as wireless network interface circuitry.

In many embodiments of the invention, setting up speakers involves the use of a mobile device, such as a smartphone or tablet, which has a display screen with a graphical user interface. The display screen may be a touch screen. In several embodiments, the mobile device includes a microphone and/or one or more other playback devices in the playback system include a microphone that can be used in the setup process. The process of setting up the speakers can incorporate capturing selections on the display screen made by a user, transmitting an audio signal to the one or more speakers, and/or receiving audio played back through the one or more speakers on the microphone of the mobile device and/or playback device(s). In some embodiments, the mobile device used for setup may also be a control device for directing playback of content as described further below.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
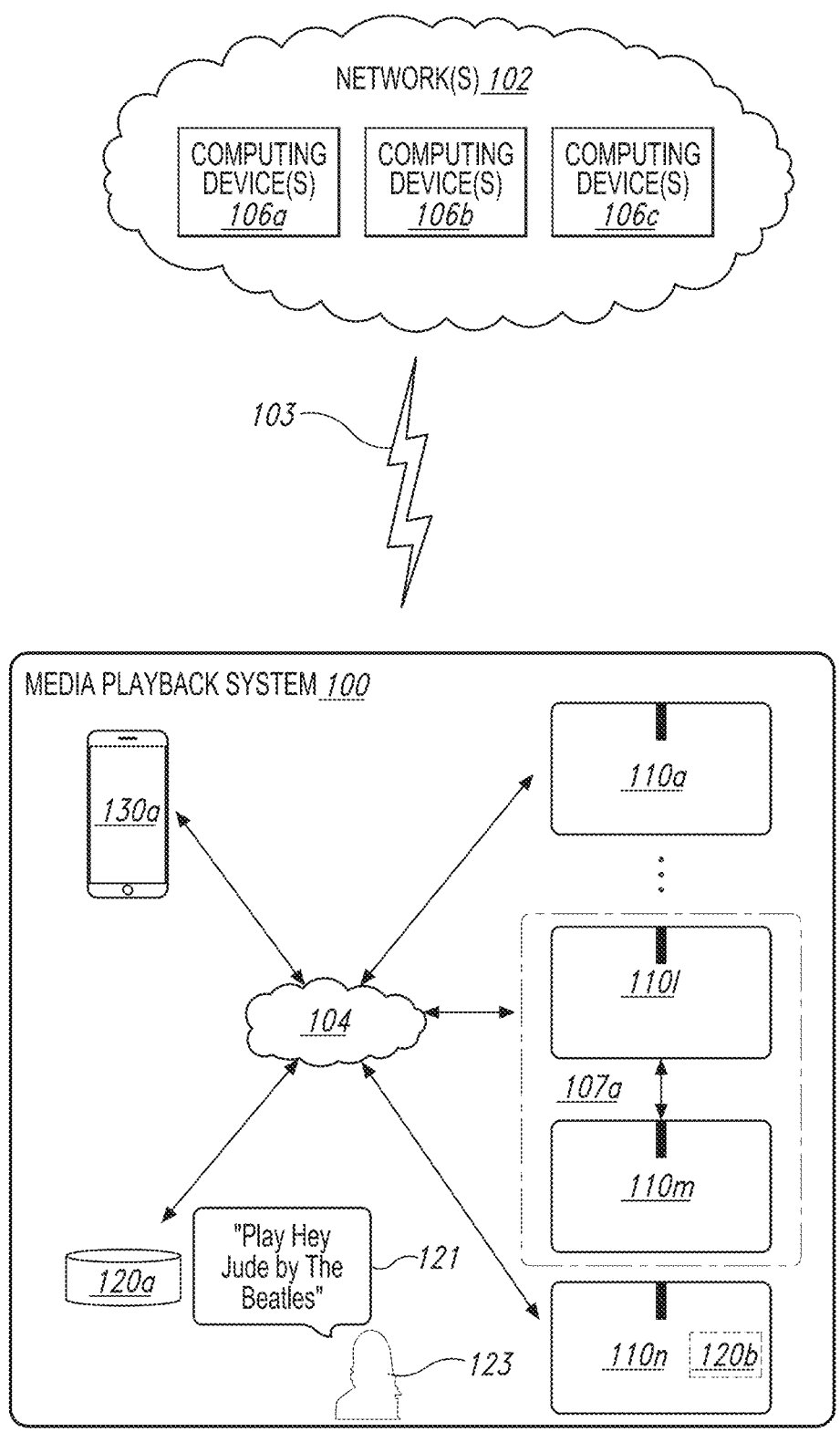
FIG. 1B is a schematic diagram of the media playback system of FIG. 1A and one or more networks.

FIG. 1B is a schematic diagram of the media playback system 100 and at least one cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. In many embodiments, a cloud network 102 is configured to deliver media content (e.g., audio content, video content, photographs, social media content) to the media playback system 100 in response to a request transmitted from the media playback system 100 via the links 103. In some embodiments, a cloud network 102 is configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) facilitate one or more operations on behalf of the media playback system 100.

In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103.

In response to receiving the voice input data, the computing device 106c processes the voice input data (i.e., "Play Hey Jude by The Beatles"), and determines that the processed voice input includes a command to play a song (e.g., "Hey Jude"). In some embodiments, after processing the voice input, the computing device 106c accordingly transmits commands to the media playback system 100 to play back "Hey Jude" by the Beatles from a suitable media service (e.g., via one or more of the computing devices 106) on one or more of the playback devices 110. In other embodiments, the computing device 106c may be configured to interface with media services on behalf of the media playback system 100. In such embodiments, after processing the voice input, instead of the computing device 106c transmitting commands to the media playback system 100 causing the media playback system 100 to retrieve the requested media from a suitable media service, the computing device 106c itself causes a suitable media service to provide the requested media to the media playback system 100 in accordance with the user's voice utterance.

b. Suitable Playback Devices

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
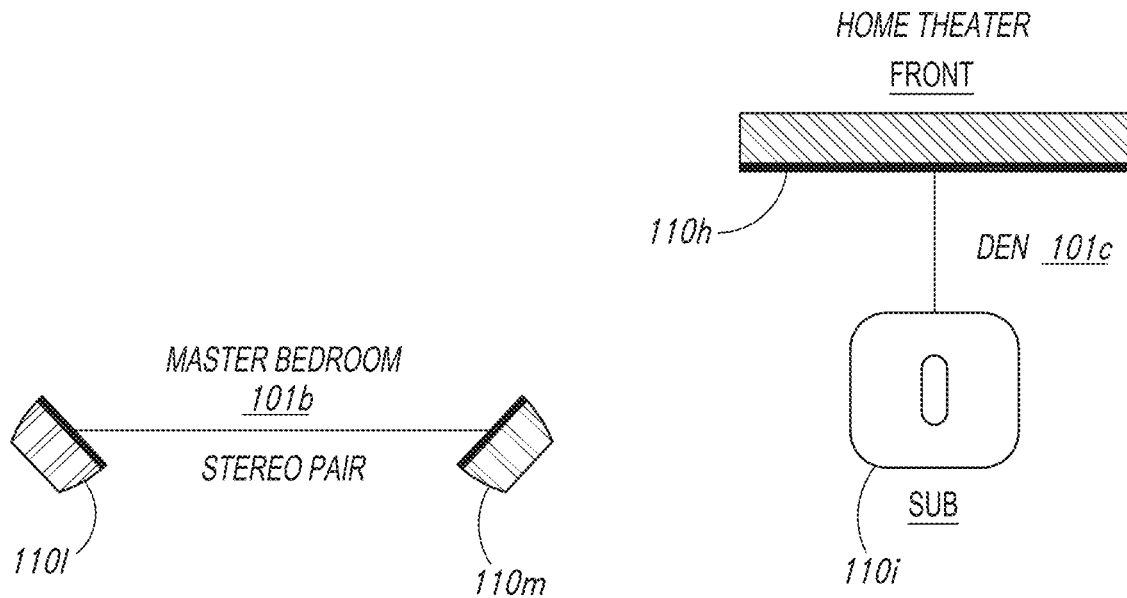
FIG. 1C is a block diagram of a playback device in accordance with certain embodiments of the invention.
FIG. 1D is a block diagram of a playback device in accordance with certain embodiments of the invention.
FIG. 1E is a block diagram of a network microphone device in accordance with certain embodiments of the invention.
FIG. 1F is a block diagram of a network microphone device in accordance with certain embodiments of the invention.
FIG. 1G is a block diagram of a playback device in accordance with certain embodiments of the invention.
FIG. 1H is a partial schematic diagram of a control device in accordance with certain embodiments of the invention.
FIGS. 1-I through 1L are schematic diagrams of corresponding media playback system zones in accordance with certain embodiments of the invention.
FIG. 1M is a schematic diagram of media playback system areas in accordance with certain embodiments of the invention.
FIG. 1N is a block diagram illustrating a playback device connected to a passive speaker in accordance with certain embodiments of the invention.
Figures 1K, 1L:
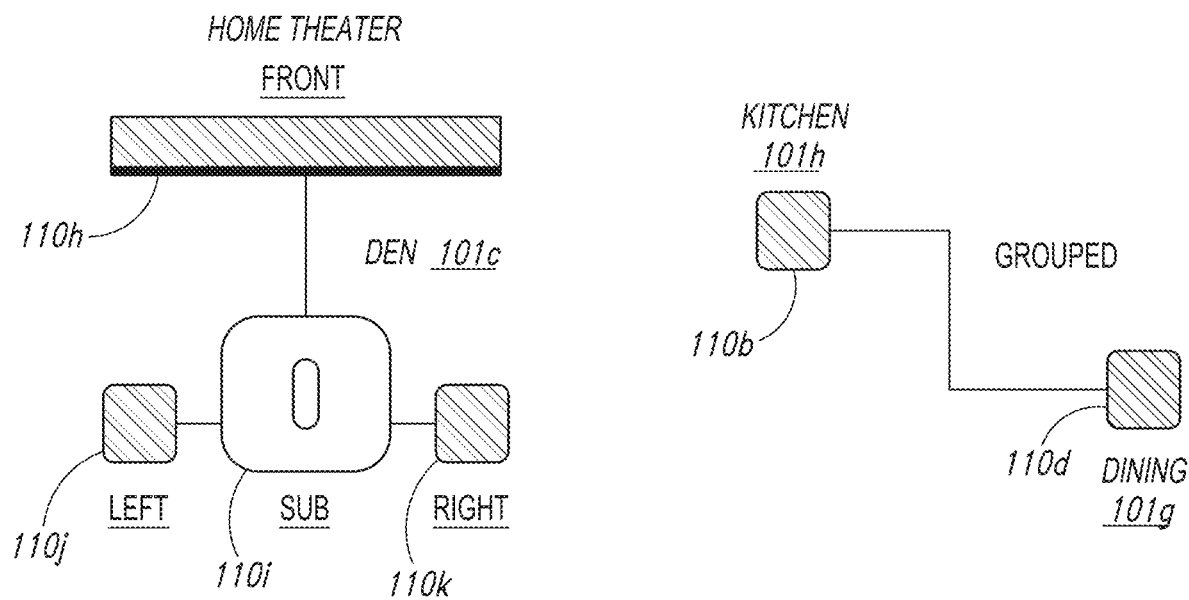
Figure 1M:
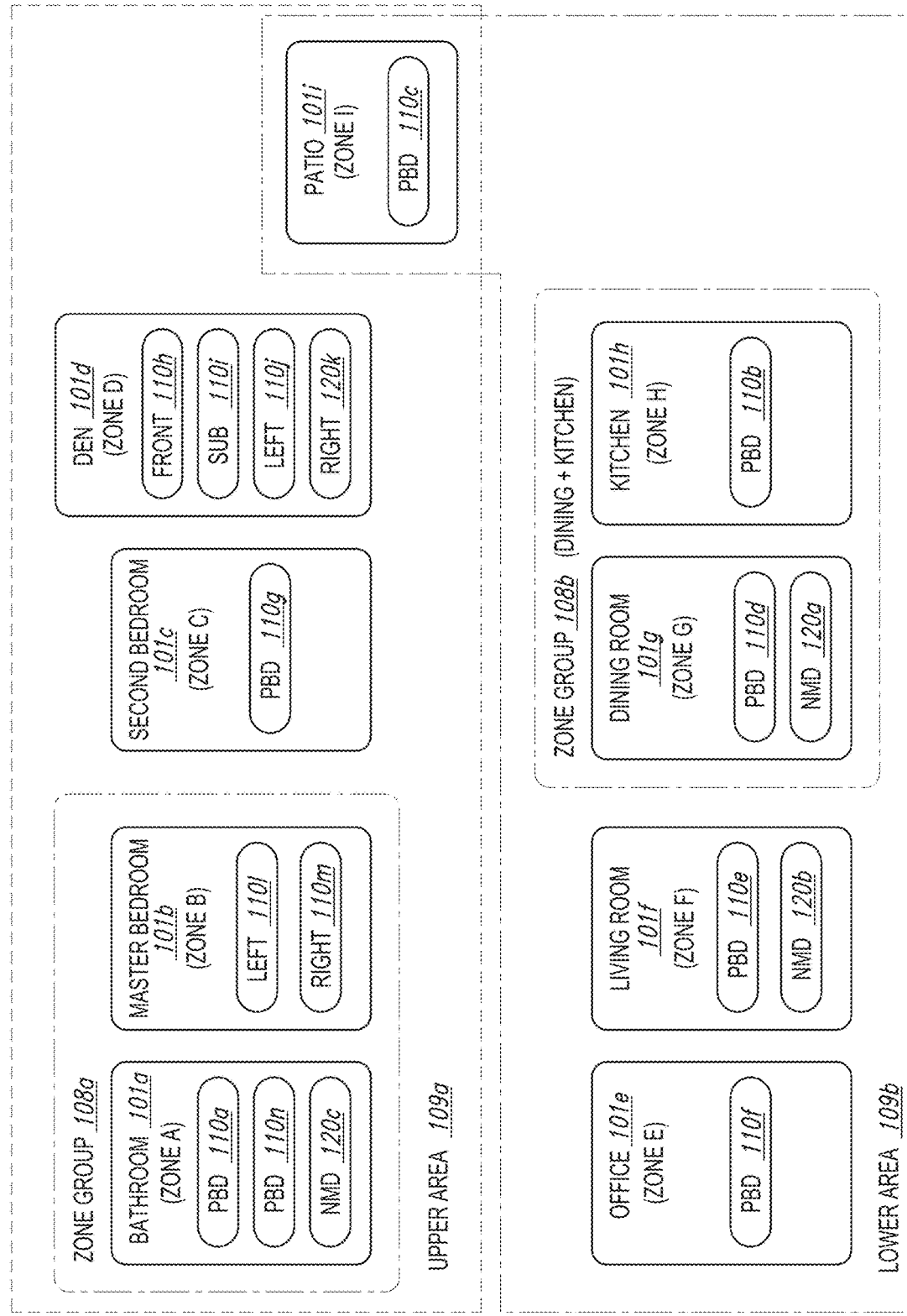

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite"

channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in U.S. Patent Publication No. 2017/0242653 titled "Voice Control of a Media Playback System," the relevant disclosure of which is hereby incorporated by reference herein in its entirety.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Patent Publication No. 2018/0107446 filed Aug. 21, 2017 and titled "Room Association Based on Name," and U.S. Pat. No. 8,483,853 filed Sep. 11, 2007, and titled "Controlling and manipulating groupings in a multi-zone media system." One playback device in a group can be identified as a group coordinator for the group, such as described in U.S. Patent Publication No. 2017/0192739 titled "Group Coordinator Selection." The relevant disclosure of each of these applications is incorporated herein by reference in its entirety. In some embodiments, the media playback system 100 may not implement Areas, in which case the system may not store variables associated with Areas.

Figure 1N:
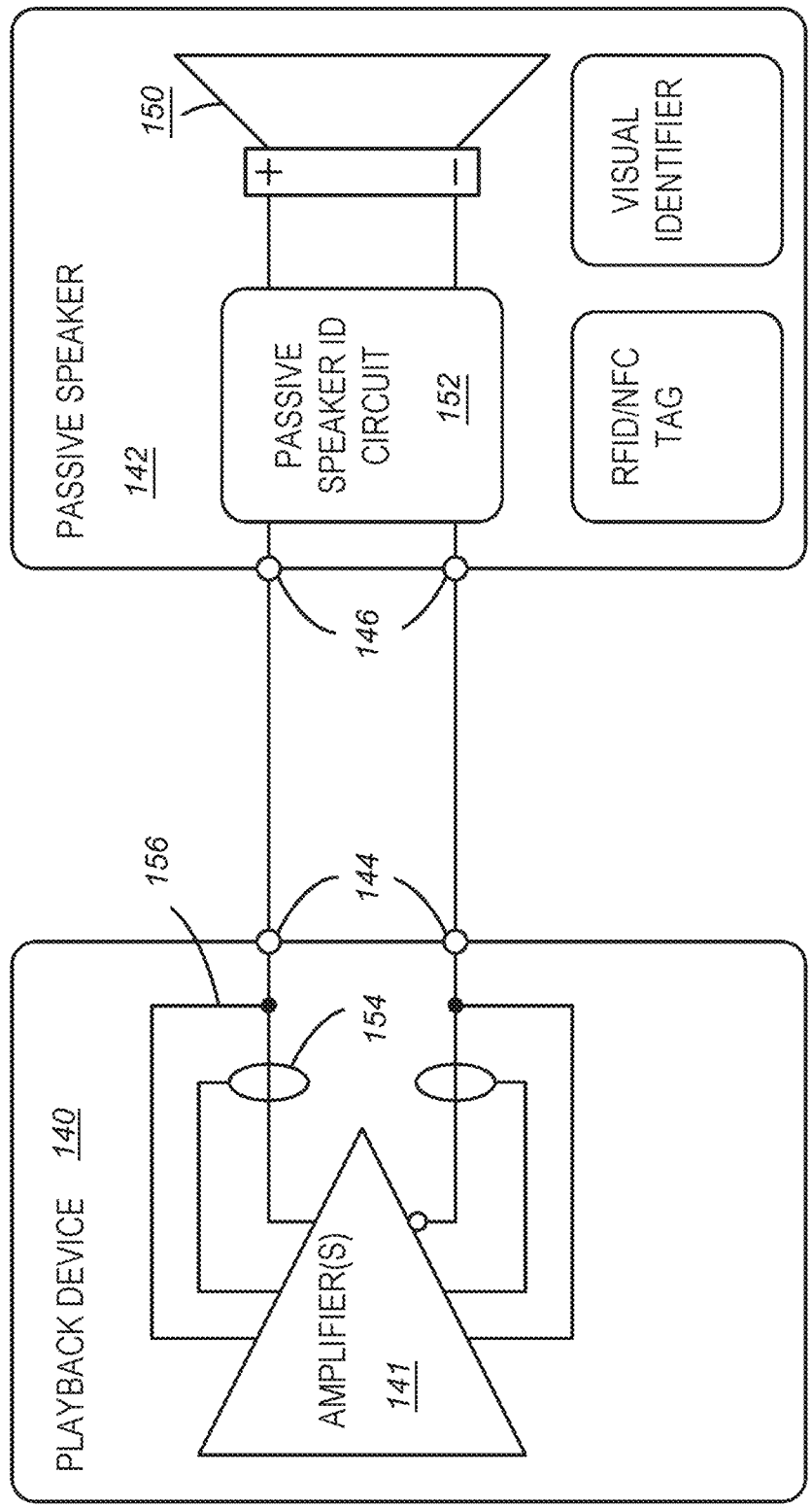

In particular embodiments of the invention, one or more of the playback devices have an audio amplifier and output terminals for connection to or that are connected to input terminals of a passive speaker. FIG. 1N is a block diagram of a playback device 140 configured to drive a passive speaker 142 external to the playback device 140. As shown, the playback device 140 includes amplifier(s) 141, as well as one or more output terminals 144 coupleable to one or more input terminals 146 of the passive speaker.

The passive speaker 142 includes one or more transducers 150, such as one or more speaker drivers, configured to receive audio signals and output the received audio signals as sound. The passive speaker 148 further includes a passive speaker identification circuit 152 for communicating one or more characteristics of the passive speaker 148 to the playback device 140. Current sensor 154 and/or voltage sensor 156 connected to the amplifier(s) 141 of playback device 140 may be utilized to aid in determining characteristics of the passive speaker 148 and/or communicate with the passive speaker identification circuit 152. Additional details regarding techniques for identifying a passive speaker using a playback device are discussed in U.S. patent application Ser. No. 16/115,525 entitled "Passive Speaker Authentication" (the '525 patent), incorporated by reference further above.

III. Example Systems and Devices

Figure 2A:
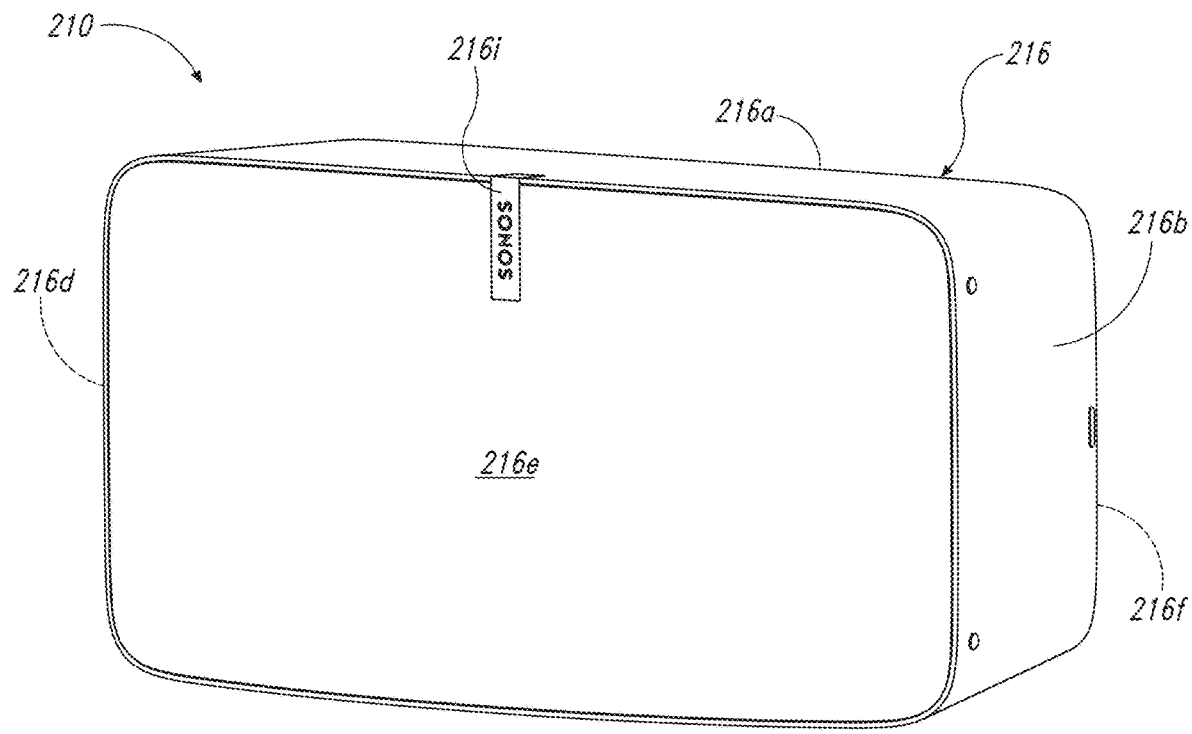
FIG. 2A is a front isometric view of a playback device configured in accordance with certain embodiments of the invention.
Figure 2B:
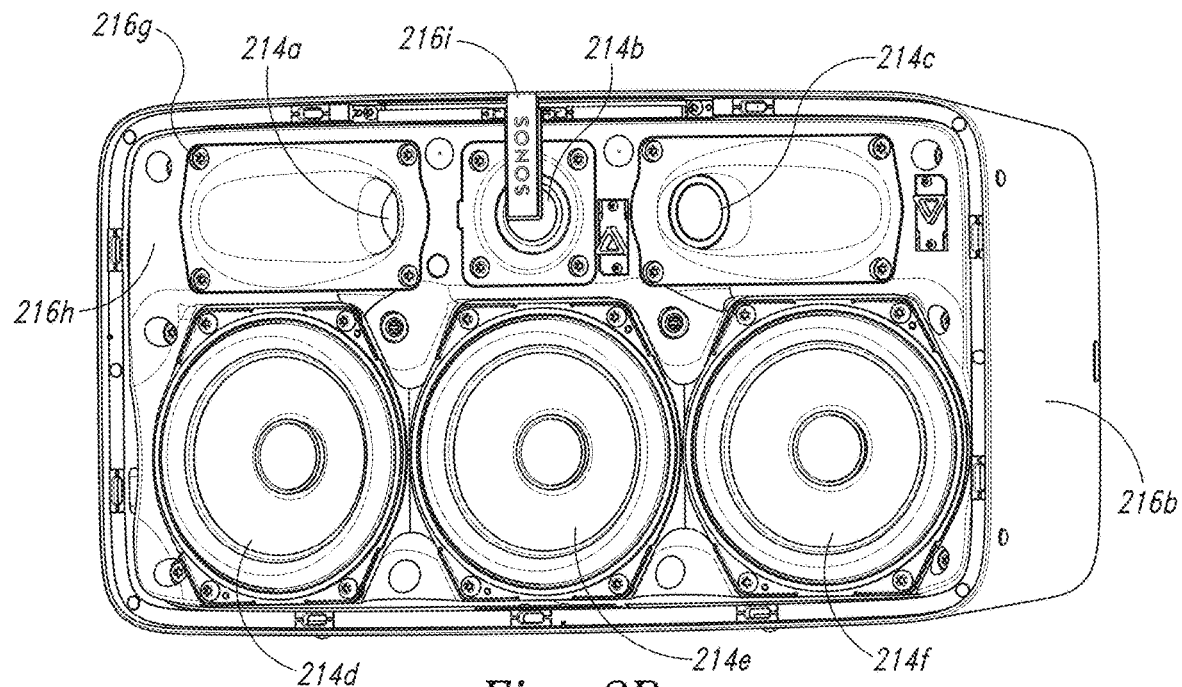
FIG. 2B is a front isometric view of the playback device of FIG. 3A without a grille.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
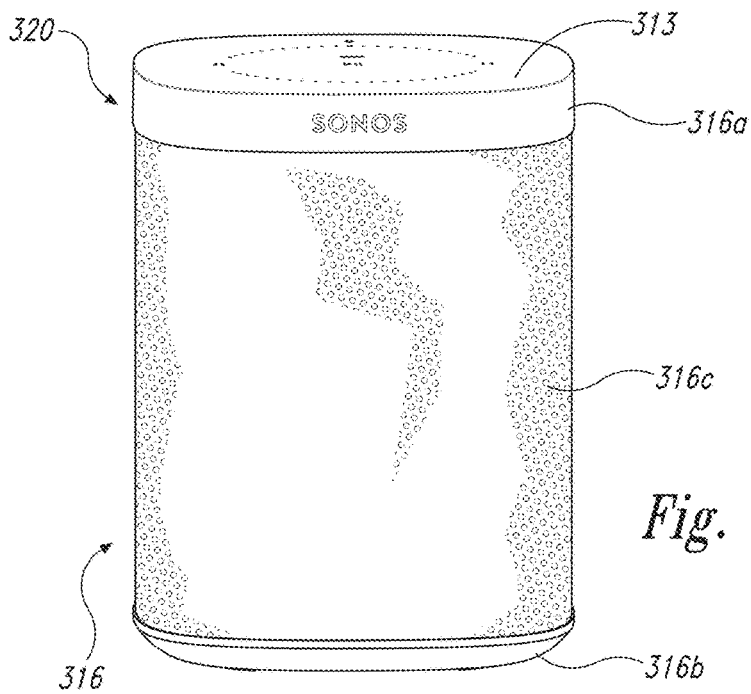
FIG. 3A is a front view of a network microphone device configured in accordance with certain embodiments of the invention.
Figure 3B:
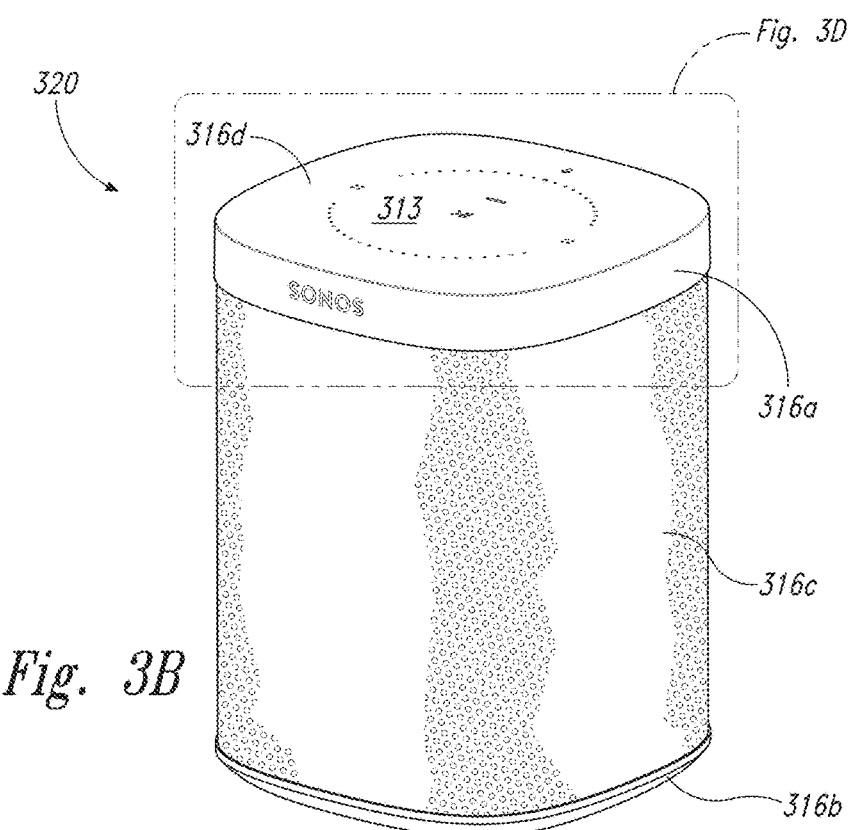
FIG. 3B is a side isometric view of the network microphone device of FIG. 3A.
Figure 3C:
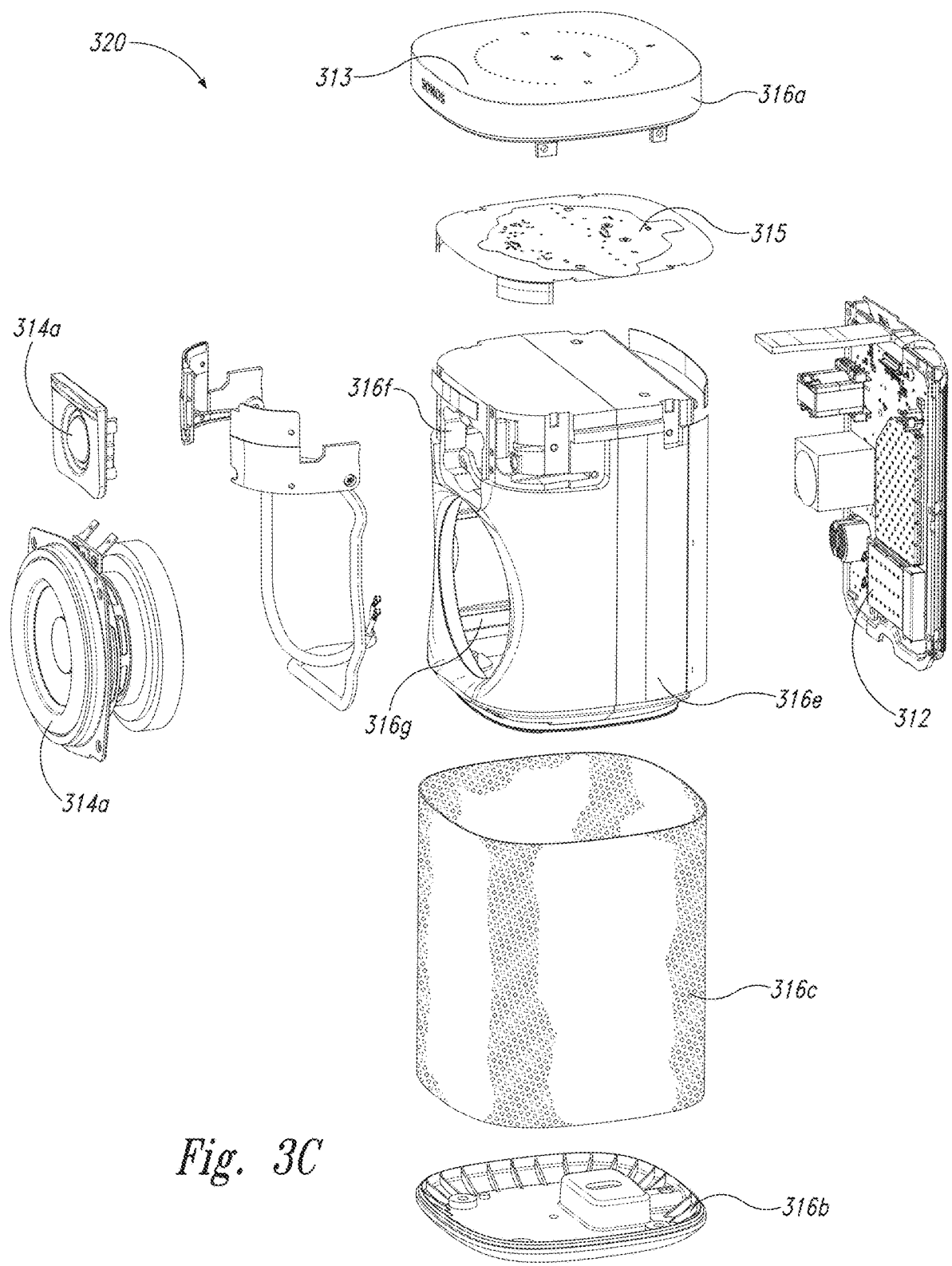
FIG. 3C is an exploded view of the network microphone device of FIGS. 3A and 3B.
Figure 3D:
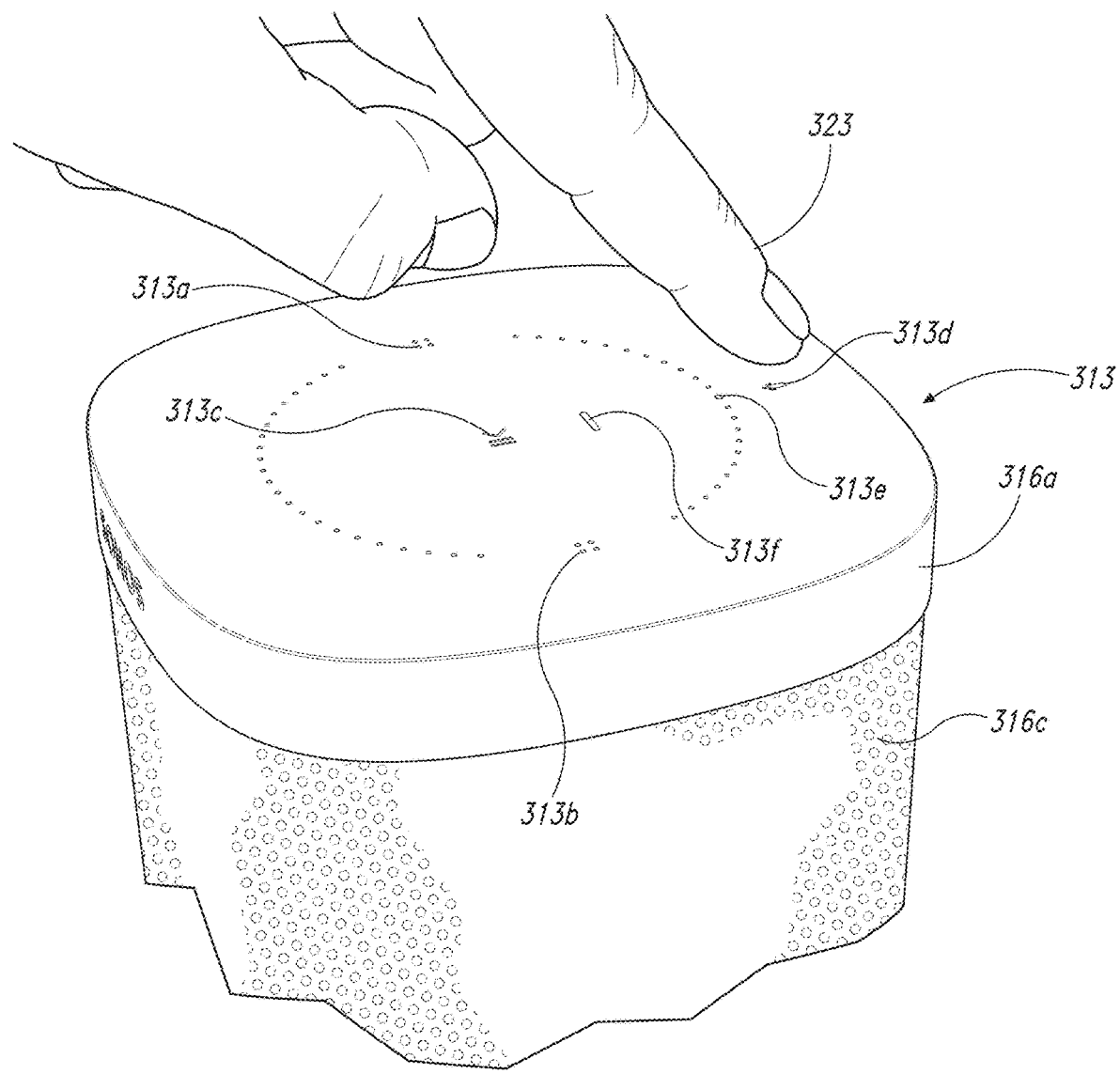
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
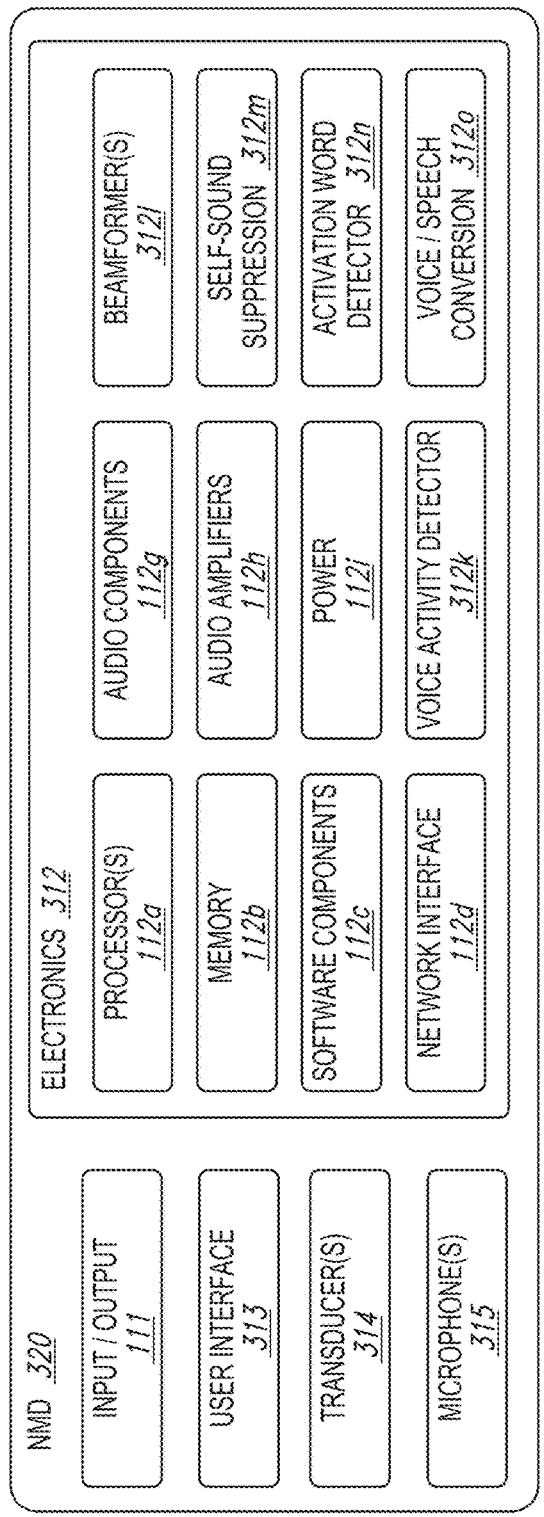
FIG. 3E is a block diagram of the network microphone device of FIGS. 3A-3D in accordance with certain embodiments of the invention.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service.

To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
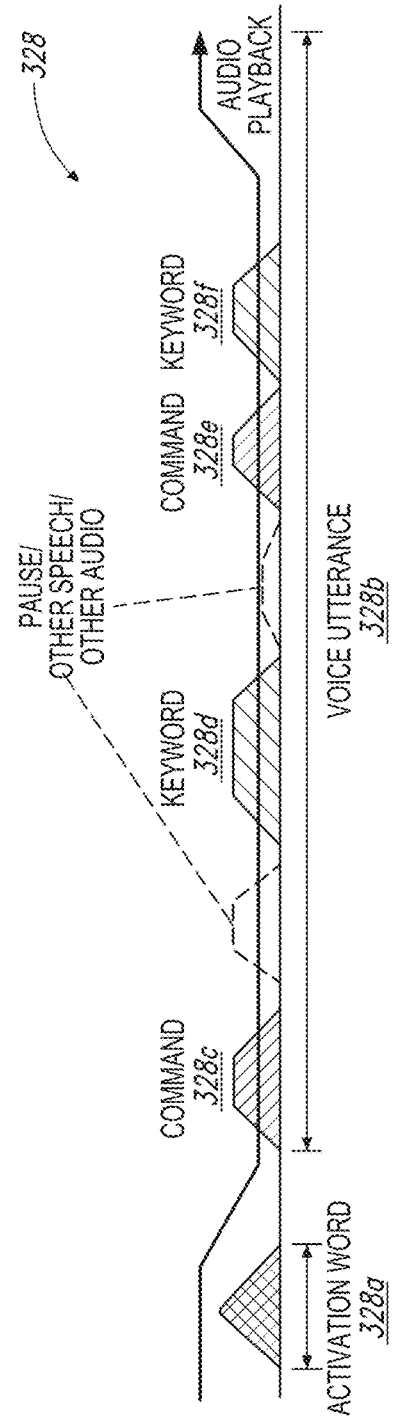
FIG. 3F is a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. Patent Publication No. 2017/0242653 titled "Voice Control of a Media Playback System," the relevant disclosure of which is hereby incorporated by reference herein in its entirety.

Figure 4A:
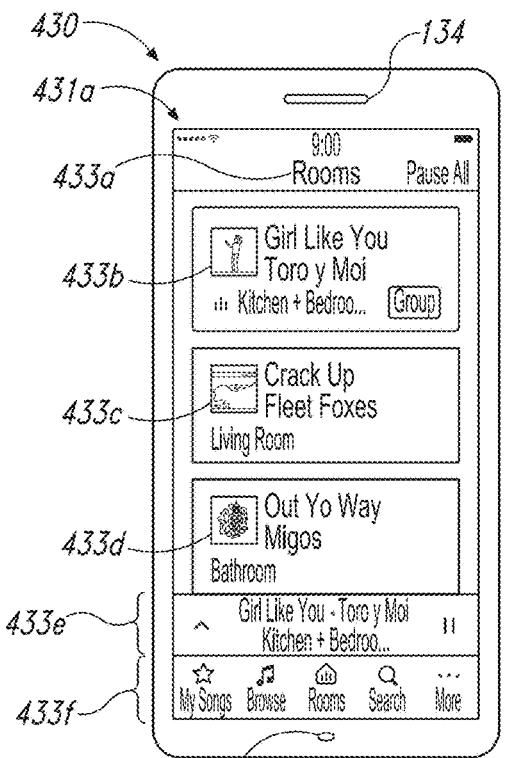
FIGS. 4A-4D are schematic diagrams of a control device in various stages of operation in accordance with certain embodiments of the invention.
Figure 4B:
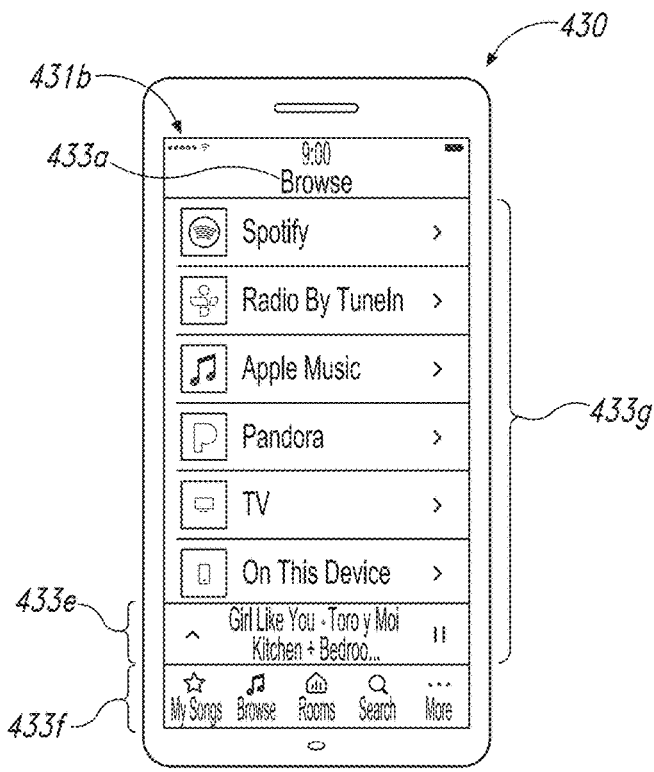
Figure 4C:
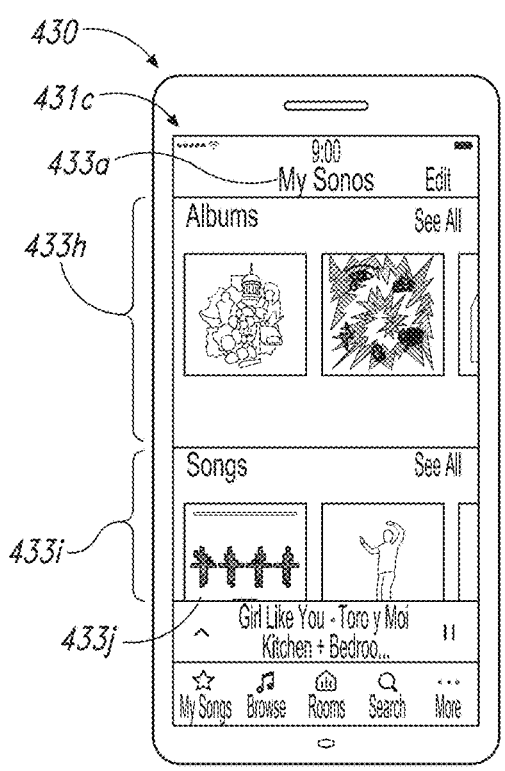
Figure 4D:
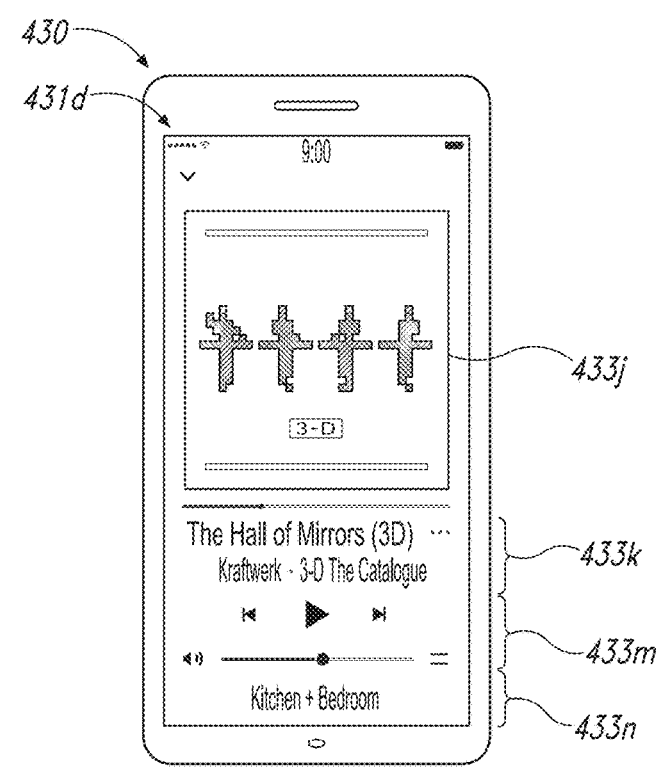

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
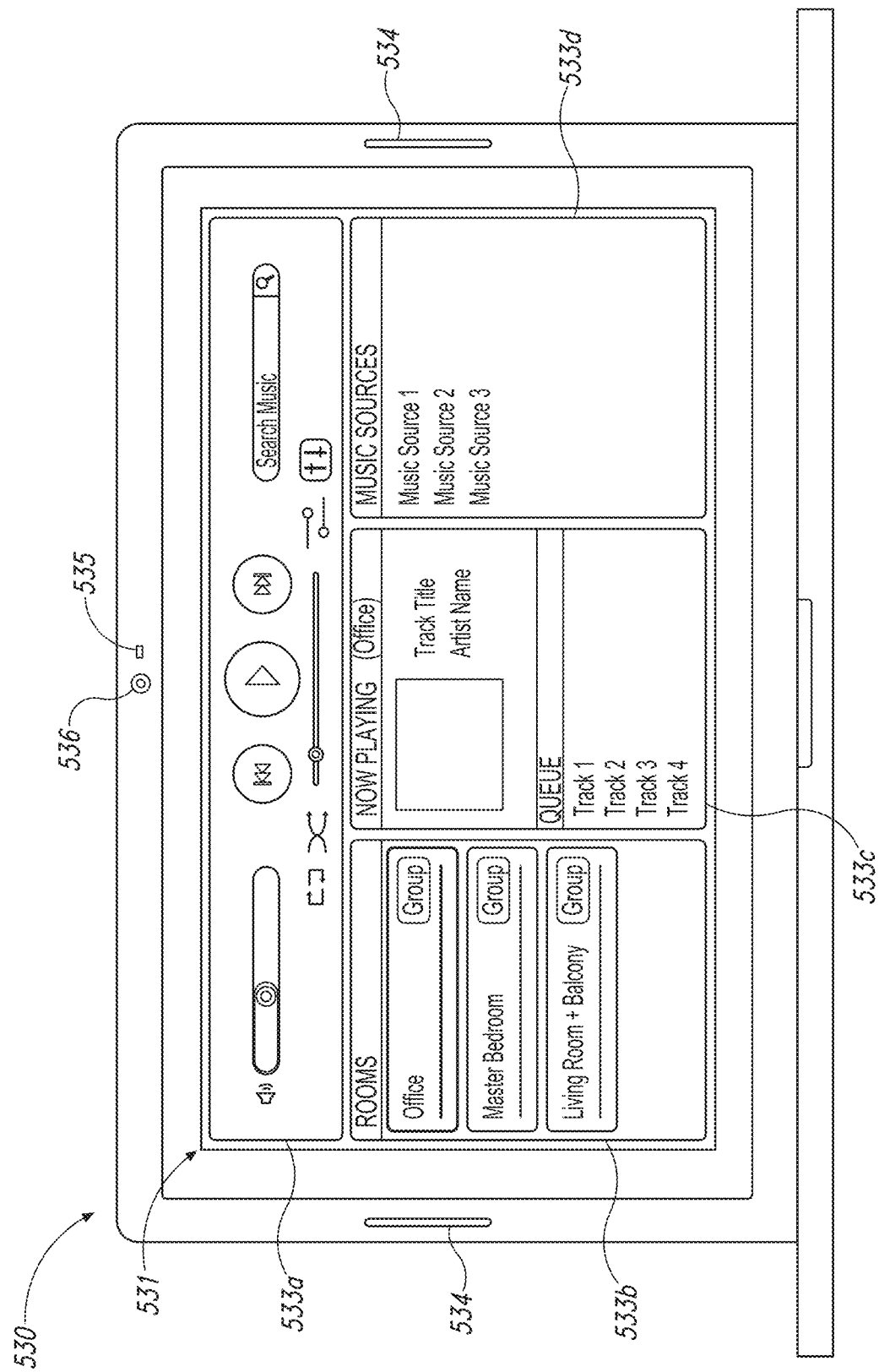
FIG. 5 is front view of a control device in accordance with certain embodiments of the invention.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, cross-fade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
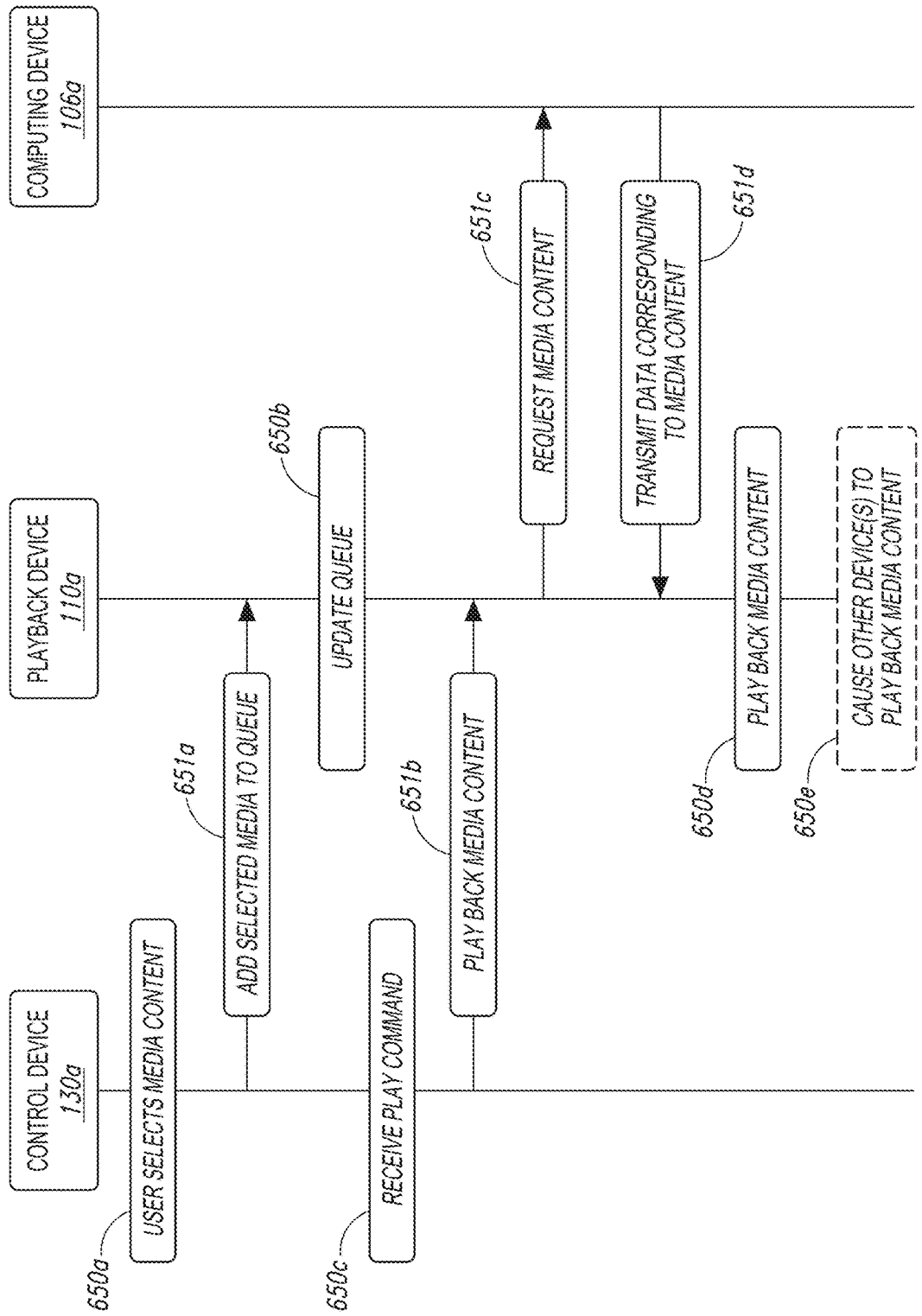
FIG. 6 is a message flow diagram of a media playback system in accordance with certain embodiments of the invention.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Setup and Configuration of a Media Player Device Using a Graphical User Interface on a Mobile Device Playback systems in accordance with certain embodiments of the invention incorporate media playback devices that may be one of a variety of device models or types, for example, portable devices. Setup and/or configuration of such devices may be performed using a graphical user interface on the display screen of a mobile device. Such graphical user interface may be generated by and/or controlled by a controller application on the mobile device. Several subprocesses are discussed below and then a higher level configuration process that incorporates some of the elements of the individual subprocesses.

The mobile device may execute any of a variety of operating systems (e.g., iOS or Android) and certain aspects and/or options in the process may depend on capabilities of the operating system.

A network setup introductory process in accordance with several embodiments of the invention includes displaying an introductory screen on a graphical user interface on a mobile device. Such introductory screen can be displayed based upon any of a variety of trigger conditions, such as, but not limited to, the selection of a setup function within an application, such as a mobile application, or on startup of a mobile application. Upon an indication to continue, such as by selection on a user interface of a "Continue" or similar button, the process proceeds to display a first product selection screen. The first product selection screen can display text to request a selection of what product type to set up and in some embodiments indicates that a particular product(s) should be set up before other products. The process includes receiving an input indicative of a product type on the graphical user interface and proceeds to displaying a next screen based upon the selected product type.

When the selected product type is "speakers," the process can proceed to a "speaker hardware setup" subprocess. When the product type is "network extender device," the process can proceed to a "network extender hardware setup" subprocess.

Portable Device Permissions Subprocess

The "portable device permissions" subprocess includes identifying the operating system of the mobile device on which the controller application is running. If the operating system is iOS, the process checks whether Bluetooth is enabled on the mobile device. If Bluetooth is not enabled, the device displays a screen instructing the user to turn on Bluetooth. In some embodiments, the text provides more details on how it can be enabled on that particular device. If Bluetooth is then enabled, the process proceeds to a "starting" screen. If the "portable device permissions" subprocess was entered from a "portable alternate setup" subprocess, the process returns to the "portable alternate setup" subprocess. Otherwise, the process continues to a "BLE Setup" subprocess.

If an exit function such as "skip" or "cancel" are selected on the screen instructing the user to turn on Bluetooth, the process proceeds to a cancellation confirmation screen. The cancellation confirmation screen requests confirmation to cancel setup. If a negative indication is selected, such as "no" or "go back," display returns to the previous screen. If an affirmative indication is selected, such as "yes" or "cancel setup," then the process is ended.

From checking and determining that the operating system is iOS, if Bluetooth is already enabled, or the controller is being connected to an existing household, the process determines if location services is enabled globally on the mobile device (i.e., the on-board GPS and/or other components to aid in providing location information are enabled and providing information to the operating system and/or applications) or if the operating system is Android lower than version 6.0. If so, then the process checks the operating system that location services is indeed enabled. In some embodiments, a short delay such as a timer of 5 seconds is enacted before proceeding. The process then checks if Bluetooth is enabled on the mobile device. If it is, the process proceeds to a "starting" screen. If Bluetooth is not enabled, the process can display a screen requesting that Bluetooth be turned on. If input received is to turn on Bluetooth, the process enables Bluetooth or check that Bluetooth has been enabled on the mobile device and the process proceeds to a "starting" screen. If input received is to cancel or exit setup, the process proceeds to a cancellation confirmation screen.

If locations services is not enabled and the Android version is 6.0 or above, then the process displays a screen requesting that location services be turned on or enabled. If the input received is to cancel or exit setup, then a screen such as the one described above can be displayed. If the input received enables location services, then the process can proceed as above as if location services is enabled.

If the identifying the operating system of the portable device determines that the operating system is Android, the process determines if location permissions is allowed (i.e., access to information provided by the on-board GPS and/or other components to aid in providing location information) for the setup mobile application within the operating system of the mobile device. If it is, the process proceeds to determines if location services is enabled globally on the mobile device (i.e., the on-board GPS and/or other components to aid in providing location information are enabled and providing information to the operating system and/or applications) or if the operating system is Android lower than version 6.0 as discussed further above.

If location permissions is not allowed for the setup mobile application, the process determines if the setup mobile application is permitted to open the operating system screen for enabling location permissions. If it is permitted, the process can display a screen to request that location access be allowed. If the input received is to cancel or exit setup, then a screen such as the one described above can be displayed. If the input received is to "continue" or otherwise proceed, the process displays the operating system screen for enabling location permissions. If location permissions becomes enabled, the process proceeds to determining if location services is enabled globally on the mobile device or if the operating system is Android lower than version 6.0 as discussed further above. If location permissions is not enabled, the process returns to determining if the setup mobile application is permitted to open the operating system screen for enabling location permissions.

If in determining if the setup mobile application is permitted to open the operating system screen for enabling location permissions, the setup mobile application is not permitted, then the process can display a screen to request that location access be allowed. This screen can provide more instructions for how to access the operating system screen for enabling location permissions. If the input received is to cancel or exit setup, then a screen such as the one described above can be displayed. If the input received is to "continue" or otherwise proceed, the process waits for location permissions to become enabled in the operating system. If location permissions does not enabled, the process can return to the determining if the setup mobile application is permitted to open the operating system screen for enabling location permissions. If locations permissions becomes enabled, the process can proceed to determining if location services is enabled globally on the mobile device or if the operating system is Android lower than version 6.0 as discussed further above.

BLE Setup Subprocess

Bluetooth Low Energy (BLE) is a wireless communications technology designed for low energy applications, such as for smart home, health, and fitness. A "BLE Setup" subprocess may be utilized in many embodiments of the invention to connect a mobile device to a media playback device using BLE for the mobile device to configure the media playback device. It may be entered into by any of several of the other subprocesses described here, including but not limited to, Device Permissions, Portable Device Permissions, Speakers Found, Power Up Light, Speaker Selection, Network Credentials, Speaker Hardware Setup, WAC Setup, and Button Press subprocesses. When entering from Speaker Selection, Network Credentials, Speaker Hardware Setup, WAC Setup, or Button Press subprocesses, the process may determine whether the mobile device has all necessary permissions and services for BLE scanning.

If not all necessary permissions and services are enabled or if during the BLE Setup subprocess the BLE connection is lost due to a change in service (e.g., Bluetooth or location services is disabled on the mobile device), the process may perform the "Portable Device Permissions" subprocess and then proceed in this process. If all necessary permissions and services are enabled, then the process displays a screen indicating to place the speaker or device being set up into "Open AP mode," such as the "button press" screen. "Open AP" mode may refer to an advertising and discovery process pursuant to the BLE specification in which the media playback device, as a BLE device, broadcasts advertising packets. Advertising packets may include information about the media playback device such as, but not limited to, a serial number that is unique to the device and/or player identifier (ID) that may represent the product model, class, or category of the device. In many embodiments, Open AP mode is triggered on a device by pressing a control button on the device and the screen shows instructions for pressing the button. In several embodiments, timeouts are implemented for waiting for Open AP mode to be detected, such as a 2 second timeout to scan and detect for a button-pressed BLE device with matching serial number, a 10 second timeout for second scan, and 20 second timeout for third and subsequent scans.

If no BLE devices in Open AP mode are detected within a predetermined period (e.g., 2 minutes), the process can display a screen indicating that no BLE device in Open AP mode was detected and selections to "try again" or "cancel". Receiving input of "try again" returns to the previous screen showing instructions for entering Open AP mode. Receiving input of "cancel" can either lead to canceling setup and exiting the application, or proceeding to alternative setup scenarios. In alternative setup, the process determines if the target media player device is a portable device. If it is, proceed to "Portable Alternate Setup" subprocess. If it is not, proceed to "Temp Wire Setup" subprocess.

If a BLE device in Open AP mode is detected within the predetermined period, the process determines if the setup mobile application has the serial number of the detected device. If the setup mobile application already has the serial number of the detected device, the process skips ahead to a "getting ready screen" as describe further below. If not, the process proceeds to display a screen based upon how many button-pressed (Open AP Mode) BLE devices are detected. The number of alternative screens can be different in different embodiments.

In many embodiments, there are three alternative screens: one for having detected one device, a second for having detected more than one device but equal or less than a predetermined number of devices, and a third for having detected more than the predetermined number of devices. If one device is detected, the process displays a screen such as FIG. 13 that shows a representation of single detected device and requests confirmation that this is the device to set up. If a second range of devices (e.g., two to six devices) is detected, the process displays a screen such as FIG. 14 that shows a representation of one of the detected devices (and potentially other information such as a name, product name, and/or serial number) with the ability to "swipe" left and right (or up and down) to view other detected devices. If a third range of devices (e.g., more than six devices) is detected, the process displays a screen such as FIG. 15 that shows a representation of one of the detected devices and a drop down selection box. The drop down selection box shows a selectable identifier for a detected device (e.g., a name, product name, and/or serial number) potentially with other information about the device also on the screen outside of the drop down window. Other of the detected devices may be selected in the drop down box with associated information displaying accordingly.

Figure 13:
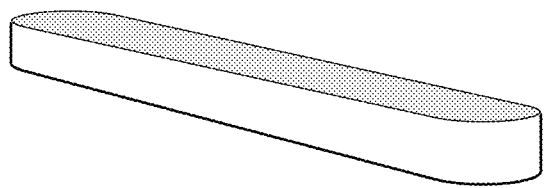
FIGS. 13, 14, and 15 are example graphical user interface screens of a device selection prompt.
Figure 14:
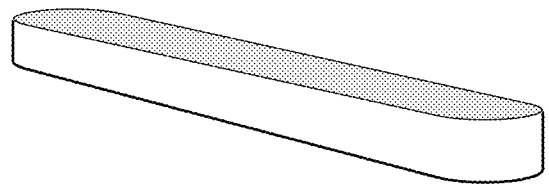
Figure 15:
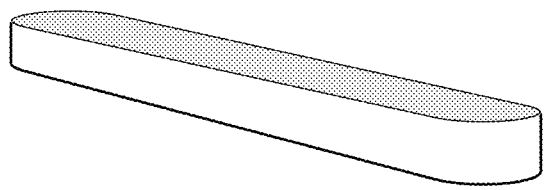

From one of the alternative screens FIGS. 13-15, if an input is received indicating to choose a different device/ speaker, the process returns to the "button press" screen described further above. If the "button press" screen has been encountered twice already within the same process, then this screen shows an "alternative setup" option instead of choosing a different device/speaker. The "alternative setup" option leads to the process determining if the target media player device is a portable device. If it is, proceed to "Portable Alternate Setup" subprocess. If it is not, proceed to "Temp Wire Setup" subprocess.

From one of the alternative screens FIGS. 13-15, if an input is received indicating that the selected detected device is the one intended to be set up (target media player device), the process proceeds to a "getting ready" screen. If the mobile device successfully connects to the target media player device via BLE, the process proceeds to a "connecting" screen. If the detected device responds to a query op, the process proceeds to a "speaker verification" subprocess described further below. If the detected device does not respond to the query op, the process proceeds to display a screen that indicates there was an error. From this screen, if input is received indicative of "try again," the process returns to the "button press" screen described further above. If input is received indicative of pursuing "alternative setup," the "alternative setup" option leads to the process determining if the target media player device is a portable device. If it is, proceed to "Portable Alternate Setup" subprocess. If it is not, proceed to "Temp Wire Setup" subprocess.

If the mobile device cannot connect to the target media player device via BLE or loses connection after a successfully connection, the process determines how many times the "button press" screen has been shown during the process. If the "button press" screen has been shown only once, the process displays a screen that indicates there was an error and provides only a single option to "try again" or continue. Receiving an input of selecting the "try again" option returns the process to the "button press" screen described above. If the "button press" screen has been shown two or more times, the process displays a screen that indicates there was an error and provides two options to "try again" or for "alternative setup." Receiving an input of selecting "try again" returns the process to the "button press" screen described above. If receiving an input of "alternative setup," the process determines whether the WAC or WACish setup subprocess has been performed during the process. If so, then the process determines if detected device is a portable device. If it is, proceed to "Portable Alternate Setup" subprocess. If it is not, proceed to "Temp Wire Setup" subprocess. If WAC or WACish setup has not been performed, the process proceeds to the "Floyd Connect" subprocess discussed further below.

Device Discovery Subprocess

In many embodiments of the invention, a "device discovery" subprocess can be used to identify one or more media playback devices that are available for connection to the local area network and control by the mobile device.

The process can determine if there is a household associated with the controller. If there is not, the process may display a "prepare device" screen. This screen can provide instructions for preparing a device for configuration, such as to provide a power supply. Receiving an input of "back" or "cancel" will return to a previous screen. Receiving an input of "continue" will proceed to a "searching" screen. Next, if there was a detected button press on a media player device that was already configured (i.e., configured to a household), the process checks if the household ID (identifier) matches the household that the mobile device is on. If it matches, the process proceeds to the "speaker verification" subprocess described further below. If the household ID does not match, the process displays a screen indicating that the media player device was configured for a different household and must be reset. Receiving input confirming that the media player device can restart this "device discovery" subprocess. Otherwise, receiving input to cancel can exit the process.

If there was not a detected button press on a media player device that was already configured, the process determines if a media player device is detected by a beaconing mechanism (such as BLE beaconing or WAC beaconing) or if unconfigured media player devices on the local network do not have a household ID. If no device is detecting by a beaconing mechanism and if there are no unconfigured media player devices on the local network that do not have a household ID, the process displays a screen indicating that no configurable media player device has been found and presents options to "try again" or "cancel." Receiving input of "try again" returns the process to a "prepare device" screen. Receiving input of "cancel" can exit the process.

If a media player device is detected by a broadcast or beaconing mechanism (such as BLE beaconing or WAC beaconing) or if unconfigured media player devices on the local network do not have a household ID, the process displays a screen based on how many media player devices are detected. The number of alternative screens can be different in different embodiments.

In many embodiments, there are three alternative screens: one for having detected one device, a second for having detected more than one device but equal or less than a predetermined number of devices, and a third for having detected more than the predetermined number of devices. If one device is detected, the process displays a screen that shows a representation of single detected device and requests confirmation that this is the device to set up or that the desired target media player device is not shown. If a second range of devices (e.g., two to six devices) is detected, the process displays a screen that shows a representation of one of the detected devices (and potentially other information such as a name, product name, and/or serial number) with the ability to "swipe" left and right (or up and down) to view other detected devices. If a third range of devices (e.g., more than six devices) is detected, the process displays a screen that shows a representation of one of the detected devices and a drop down selection box. The drop down selection box shows a selectable identifier for a detected device (e.g., a name, product name, and/or serial number) potentially with other information about the device also on the screen outside of the drop down window. Other of the detected devices may be selected in the drop down box with associated information displaying accordingly.

From one of the alternative screens, if an input is received indicating that the desired target media player device is not shown, the process displays a screen indicating that no configurable media player device has been found and presents options to "try again" or "cancel." Receiving input of "try again" returns the process to a "prepare device" screen. Receiving input of "cancel" can exit the process.

From one of the alternative screens, if an input is received indicating that the selected detected device is the one intended to be set up (target media player device), the process determines if this system is part of a new household (i.e., not having an existing household ID). If it is, the process determines if the target media player device is a portable device or not. If it is a portable device, the process proceeds to the "portables setup" subprocess described further below. If it is not a portable device, the process proceeds to the "standard initial setup" subprocess described further below.

If the system is not part of a new household (i.e., an existing household with existing household ID), the target media player device is treated as a device to be added to the existing household. The process determines if the target media player device is connected to the local network. If the device is on the local network, the process proceeds to the "button press" subprocess described further below. If the device is not on the local network, the process determines if the device supports SonosNet architecture. If it does not support SonosNet, the process determines if the target media player device is a portable device or not. If it is a portable device, the process proceeds to the "portables setup" subprocess described further below. If it is not a portable device, the process proceeds to the "BLE Setup" subprocess described further above.

If the device does support SonosNet, the process determines if the household is SonosNet capable. If the household is SonosNet capable, the process proceeds to the "button press" subprocess described further below. If the household is not SonosNet capable, the process determines if the target media player device was detected by BLE. If it was detected by BLE, the process proceeds to the BLE setup process described further above. If it was not detected by BLE, it may have been detected by WAC and the process determines if the mobile device is running an Android or iOS operating system. If it is running Android, the process proceeds to the "WACish setup" subprocess described further below. If it is running iOS, the process determines if the mobile device has an Auth chip. If it has an Auth chip, the process proceeds to the "WAC setup" subprocess described further below. If it does not have an Auth chip, the process proceeds to the "Floyd connect" subprocess described further below.

If there is a household associated with the controller, the process determines if there are any prior media player devices or network extender found on the local network. If there is at least one prior media player device or network extender, the process proceeds to a "prepare device" screen such as that described above. If no prior devices are found, the process displays a "system offline" screen that mentions that no media player devices are found on the local network and requests connection of at least one of the existing media player devices to the local network. If the input received indicates to cancel, the process ends. If the input indicates that a new system should be set up, the process displays a screen indicating that the target media player device will be set up in a new system and proceeds to a "prepare device" screen such as that described above. If the input received indicates to continue without setting up a new system (e.g., "continue"), the process displays a "searching for system" screen. If within a predetermined timeout period (e.g., one minute) an existing media player device or network extender is reconnected to the network and detected, the process proceeds to a "system found" screen and then a "prepare device" screen such as that described above. If the predetermined timeout period expires without an existing media player device or network extender being detected, the process proceeds to a "system not found" screen. If an input received indicates to "cancel" then the process ends. If an input received indicates to "try again," the process returns to the "searching for system" screen discussed above.

Portables Setup Subprocess

The "portables setup" subprocess includes determining whether the target media player device is connected to a constant power source (e.g., power outlet or external non-battery power sources). If it is not, the process displays a "connect to power" screen that instructs to connect the device to power and proceeds once the device is connected to power. If the device is already connected to power then the process also proceeds. The process determines whether the target media player device is connected to an Ethernet connection. If it is not on Ethernet, the process determines if it is otherwise still connected to the local network. If it is on the local network, the process proceeds to the "button press" subprocess and then the "added player" subprocess described further below. If it is not on the local network, the process enters the "BLE setup" subprocess and passes in cached SSID credentials and whether there is a new or existing household setup. After the "BLE setup" subprocess, the process displays a "WiFi setup complete" screen indicating that the target media player device is now connected to WiFi and then proceeds to the "added player" subprocess described further below.

If when determining the target media player device is on Ethernet, the device is on Ethernet, the process proceeds to display a screen asking if the device should stay wired. If the input received indicates to leave the device wired, the process proceeds to the "button press" subprocess and then the "added player" subprocess described further below. If the input received indicates to set the device up wirelessly, the process proceeds to an "unplug Ethernet" screen. If input received indicates to "continue," then the process returns to the beginning of the "portable setup" subprocess. If input received indicates to "cancel," then the process exits.

Portable Help Subprocess

The "portable help" subprocess can be entered from any of a number of other subprocesses, including the "BLE setup" subprocess. The "portable help" subprocess includes displays a screen indicating that there is trouble setting up the target media player device. The process proceeds, such as by receiving input indicating to "continue," and determines whether the setup mobile application has all necessary permissions (such as Bluetooth enabled, location access, etc.) that would be obtained through the "portable device permissions" subprocess. If all permissions are granted, the process continues. If not all permissions are granted, the "portable device permissions" subprocess is performed before continuing. The process displays a "power off" screen instructing that the target media player device shower be powered off. This can include removing it from a constant power source (e.g., charging cable or base, wall outlet, etc.) and using controls to power it off. In some embodiments, when this screen is encountered for the second or subsequent time during the process, a "cancel" button is shown that can enable the process to exit. Receiving input of "cancel" can proceed to display a "cancel confirmation" screen, where an input of "go back" returns to the previous screen and an input of "cancel setup" exits the process.

When an input is received to indicate that the instructions were followed (e.g., device powered off), the process proceeds to a "connect to power" screen. If input is received confirming that the device is connected to power, the process proceeds to a "searching for device" screen. The process determines if the setup mobile application has the serial number of the detected device. If the setup mobile application already has the serial number of the detected device, the process skips ahead to determine if the device was set up via WAC or BLE beaconing as discussed further below.

From, if the setup mobile application does not have the serial number of the detected device, the process displays a screen based on how many media player devices are detected. The number of alternative screens can be different in different embodiments.

In many embodiments, there are three alternative screens: one for having detected one device, a second for having detected more than one device but equal or less than a predetermined number of devices, and a third for having detected more than the predetermined number of devices. If one device is detected, the process displays a screen that shows a representation of single detected device and requests confirmation that this is the device to set up or to return to the previous screen ("back"). If a second range of devices (e.g., two to six devices) is detected, the process displays a screen that shows a representation of one of the detected devices (and potentially other information such as a name, product name, and/or serial number) with the ability to "swipe" left and right (or up and down) to view other detected devices. If a third range of devices (e.g., more than six devices) is detected, the process displays a screen that shows a representation of one of the detected devices and a drop down selection box. The drop down selection box shows a selectable identifier for a detected device (e.g., a name, product name, and/or serial number) potentially with other information about the device also on the screen outside of the drop down window. Other of the detected devices may be selected in the drop down box with associated information displaying accordingly. If no players were detected, the process proceeds to a "failure" screen indicating that setup could not be completed. Receiving an input indicating to "try again" returns the process. Receiving an input to "cancel setup" exits the process.

From one of the alternative screens, if an input is received to go "back," the process returns to the previous screen. If an input is received indicating that the selected detected device is the one intended to be set up (target media player device), the process determines if the media player device was discovered via WAC or BLE beaconing. If the media player device was not discovered via WAC or BLE beaconing, the process proceeds to a "failure" screen as described above. If the media player device was discovered via WAC or BLE beaconing, the process proceeds to a "getting ready" screen. In some embodiments, a timer (such as 1500 ms) counts before progressing. The process determines which technique the media player device was discovered by. If discovered by WAC/WACish and the mobile device is running an iOS operating system, the process proceeds to the "WAC setup" subprocess. If discovered by BLE, the process proceeds to the "BLE setup" subprocess.

WAC Setup Subprocess

The "WAC setup" process includes displaying a "wireless setup start" screen. If the received input indicates to go "back", the process goes back to the previous subprocess. If the received input indicates to "go to accessory setup", the process performs the "accessory setup" subprocess discussed further below. From that subprocess, if the received input indicates to "cancel," the process returns Otherwise, the process determines whether the media player device is connected to the local network. If it is not connected, the process jumps ahead to a "not connected" screen as discussed further below.

If it is connected, the process proceeds to a "connecting" screen. The process then determines if the media player device is found on a wireless network. If it is found on a wireless network, the process proceeds to a "button press" subprocess as discussed further below. If it is not found on a wireless network, the process proceeds to a "not connected" screen. If the received input indicates to "try again," the process returns to a "wireless setup start" screen. If the received input indicates to use an "alternative setup," the process determines if the media player device has a BLE chip. If it has a BLE chip, the process continues to "BLE setup" subprocess as discussed further above. If it does not have a BLE chip, the process continues to "button press" subprocess as discussed further below.

WACish Setup Subprocess

The "WACish setup" process includes displaying a "connecting" screen. The process determines if the mobile device successfully connects to the media player device's WAC access point. If it does, the process proceeds to "speaker verification" subprocess discussed further below. If it does not connect, the process determines if the media player device has a BLE chip. If it does, the process proceeds to an "unable to connect" screen. If it does not have a BLE chip, the process proceeds to "temp wire setup" subprocess described further below.

Processes for Configuring a Media Playback Device to Connect to LAN

Figure 7:
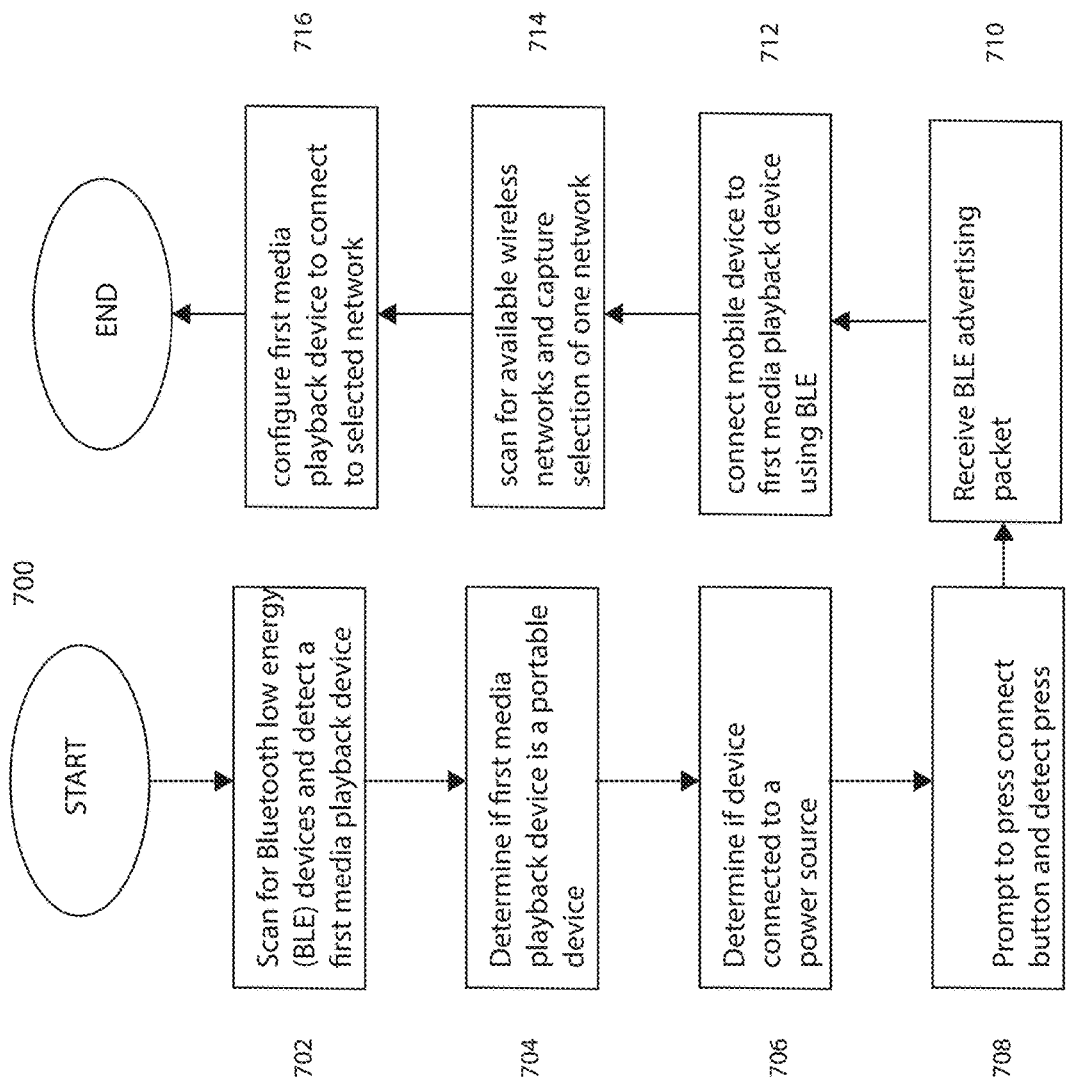
FIG. 7 illustrates a process for configuring a media playback device using a graphical user interface on a mobile device in accordance with certain embodiments of the invention.

In many embodiments of the invention, a controller application executing on the mobile device can be used to generate graphical user interface screens to guide a user through setup of a media playback device. The setup can include connecting the mobile device to the media playback device using Bluetooth low energy (BLE) and configuring the media playback device for connection to a local area network (LAN). The mobile device may also be configured to be able to connect to the LAN, although it may not necessarily be connected during the entire setup process of the media playback device. In several embodiments, the media playback device has a stored serial number and/or player identifier (ID). The serial number and/or player ID may be obtained by the mobile device from the media playback device in a variety of ways, such as wireless communication (e.g., Bluetooth or WiFi) as will be discussed below. A process for configuring a media playback device using a graphical user interface on a mobile device in accordance with an embodiment of the invention is illustrated in FIG. 7.

Figure 8:
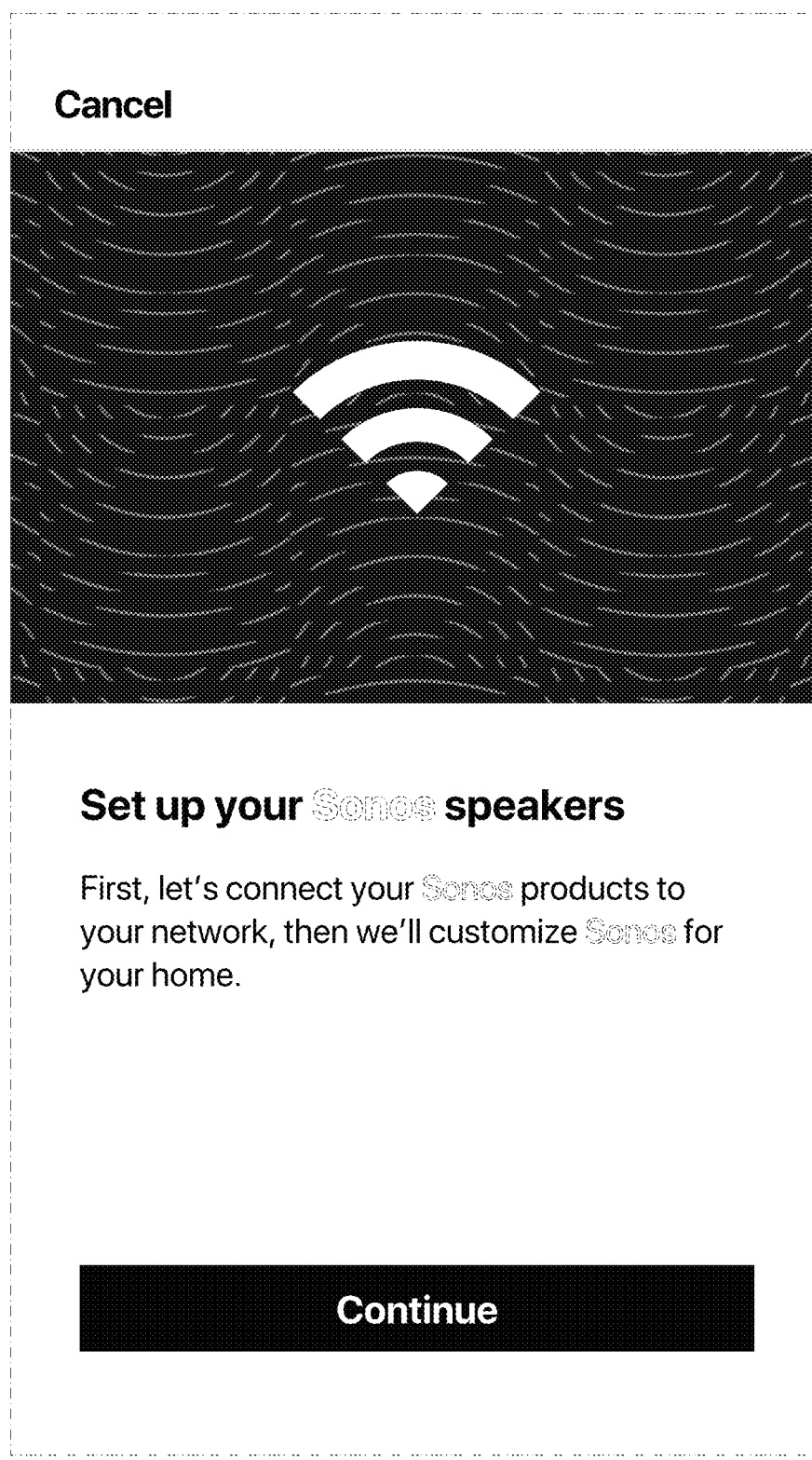
FIG. 8 is an example graphical user interface screen of a setup prompt.

The process 700 can include elements of a "device discovery" subprocess, such as those discussed further above. It can include detecting selection of a setup prompt on a graphical user interface on a mobile device. The setup prompt can indicate setup of a media playback device using a screen such as the one shown in FIG. 8.

The process 700 includes scanning (702) for compatible Bluetooth low energy (BLE) devices using the mobile device. A first media playback device can be detected as a compatible BLE device within BLE communication range of the mobile device.

The mobile device determines (704) if the first media playback device is a portable device. This can be done, for example, using identifying information such as the serial number and/or player ID of the media playback device, or by checking technical features of the device.

Figure 9:
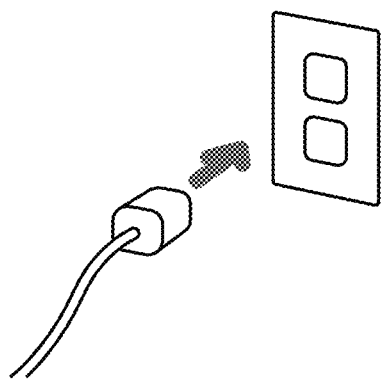
FIGS. 9 and 10 are example graphical user interface screens of a power prompt.
Figure 10:
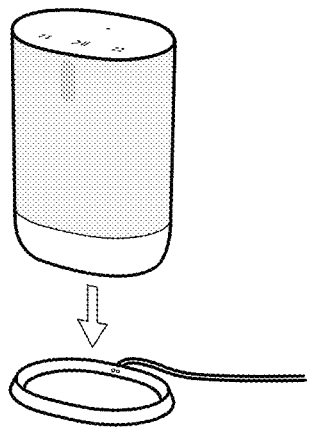

In certain embodiments, the setup process proceeds (706) only when the first media playback device is connected to a power source to ensure that the process will not be interrupted by loss of power. If the first media playback device is a portable device, the mobile device determines if the first media playback device is connected to a power source and, when the first media playback device is not connected to a power source, display a prompt on the graphical user interface until the first media playback device is connected to a power source such as shown in the screens illustrated in FIGS. 9 and 10.

Figure 11:
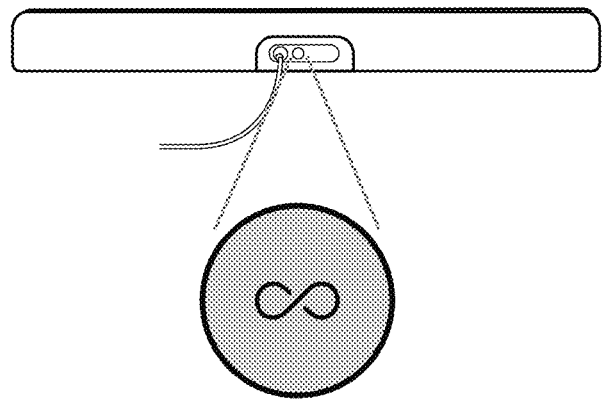
FIGS. 11 and 12 are an example graphical user interface screens of a button press prompt.
Figure 12:
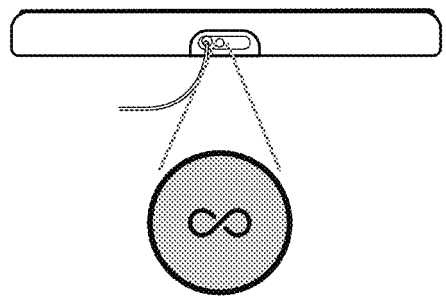

The process can include elements of a "BLE setup" subprocess, such as those discussed further above. The graphical user interface on the mobile device displays (708) a prompt for a user to press a connect button the first media playback device, such as in the example screens shown in FIGS. 11 and 12. The connect button can be one that is labeled with a symbol or other indicia for connecting the device to a system or network.

The process includes detecting (708) actuation of a connect button on the first media playback device and broadcasting a plurality of BLE advertising packets from the first media playback device after actuation is detected. BLE advertising packets are wireless communication packets defined pursuant to the BLE specification for discovering BLE devices. They are broadcast by a device on multiple frequency channels (often three) and repeated at time period referred to as an advertising interval. A delay can be added to the interval to reduce collisions.

In many embodiments of the invention, the BLE advertising packets include the serial number of the first media playback device. In additional embodiments, they also include a player identifier (ID) that can specify a product model, category, or class of device.

The mobile device receives (710) at least one BLE advertising packet from the first media playback device. The mobile device determines if it already has previously set up a media playback device with the serial number of the first media playback device and displays a prompt on the graphical user interface for selecting the first media playback device to be set up when it had not already set up the serial number of the first media playback device. In some embodiments of the invention, the mobile device receives BLE advertising packets from only one BLE device and can show a prompt to confirm this choice, such as in the screen in FIG. 13. In other embodiments it receives packets from more than one BLE device and can show a screen to confirm the choice of which device to set up, such as in the screens shown in FIGS. 14 and 15.

The mobile device connects (712) to the first media playback device using a BLE connection.

The process can include elements of a "speaker verification" subprocess, such as those discussed further above. The mobile device obtains a player identifier (ID) from the first media playback device. The player ID may be obtained, for example, via the BLE connection or from an BLE advertising packet.

The mobile device determines whether the first media playback device is compatible with one of a number of versions of controller application using the player ID. Compatibility may be based on characteristics of the model, category, or class of media playback device having that player ID, such as, but not limited to, the features, technical capabilities, hardware components and/or hardware versions.

In several embodiments of the invention, certain versions of controller application may utilize additional confirmation before proceeding with the player ID. Therefore, when the compatible controller application is determined to be a certain version, the graphical user interface may prompt the user to press the connect button on the media playback device. After the connect button is pressed, the graphical user interface may show a confirmation screen.

The mobile device can determine whether the player ID is valid and whether certain security measures are met. Validity may be checked in a variety of ways, such as by checking against a validity or revocation list or using a checksum or other mathematical method on the player ID. Security measures may also be checked in a variety of ways, such as by verifying compatibility with encryption standards, secure hardware, and/or hardware or firmware versions.

Figure 16:
FIG. 16 is an example graphical user interface screen of a network selection prompt.
Figure 17:
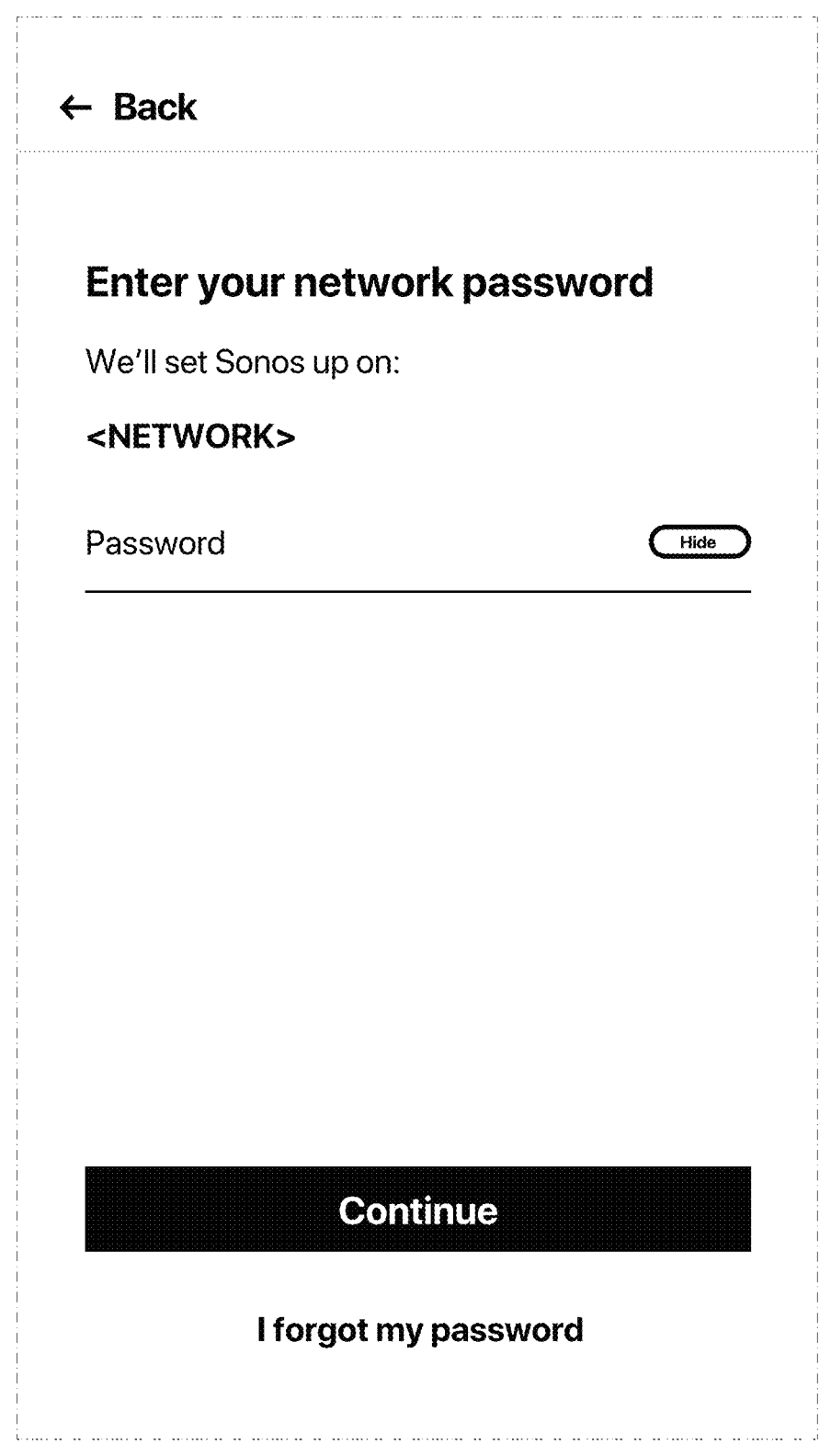
Figure 18:
FIG. 18 is an example graphical user interface screen of a network confirmation prompt.
Figure 18:

The process can include elements of a "network credentials" subprocess, such as those discussed further above. The mobile device scans (714) for available wireless networks. The graphical user interface then displays a list of the available wireless networks including the name of a particular local area network (LAN) such as with the screen shown in FIG. 16. The mobile device captures selection of the name of the LAN on the graphical user interface and prompts for a password for the LAN such as with the screen shown in FIG. 17. The mobile device configures (716) the media playback device, using the BLE connection between them, for connection the LAN. The graphical user interface can show a confirmation screen for successful connection of the media playback device to the LAN such as with the screen shown in FIG. 18.

Figure 19:
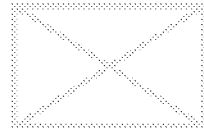
FIG. 19 is an example graphical user interface screen of a speaker configuration prompt.
Figure 19:
Figure 19:
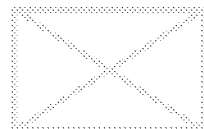
Figure 19:
Figure 19:
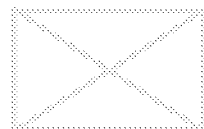
Figure 19:
Figure 21:
Figure 22:
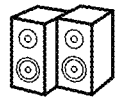
FIG. 22 is an example graphical user interface screen of a speaker configuration prompt.
Figure 22:
Figure 22:
Figure 22:
Figure 22:
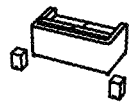
Figure 22:

The process can include elements of an "added player" subprocess, such as those discussed further above. If the media playback device is not a portable device, the graphical user interface may show options for speaker configuration of the first media playback device such as with the screen shown in FIG. 19. In several embodiments, available options can include assigning a room name such as with the screens shown in FIGS. 20 and 21, including the device in a left-right stereo pair, and/or adding the device as a surround speaker in a home theater configuration such as with the screen shown in FIG. 22. If the media playback device is a portable device, it can skip any or all of these options. The graphical user interface can display a screen indicating that configuration of the first media playback device is complete. Although a specific process is described above, one skilled in the art will recognize that any of a variety of processes may be utilized in accordance with embodiments of the invention.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A method for configuring a media playback device to connect to a local area network (LAN) and be controlled by a mobile device also configured to connect to the LAN, the method comprising:
    detecting selection of a setup prompt on a graphical user interface on a mobile device, where the setup prompt indicates setup of a media playback device and where the mobile device is connected to a local area network;
    scanning for compatible Bluetooth low energy (BLE) devices using the mobile device;
    detecting a first media playback device as a compatible BLE device within BLE communication range of the mobile device, where the first media playback device has a stored serial number;
    determine if the first media playback device is a portable device;
    when the first media playback device is a portable device, determine if the first media playback device is connected to a power source and, when the first media playback device is not connected to a power source, display a prompt on the graphical user interface until the first media playback device is connected to a power source;
    displaying a prompt on the graphical user interface on the mobile device for a user to press a connect button the first media playback device;
    detecting actuation of a connect button on the first media playback device and broadcasting a plurality of BLE advertising packets from the first media playback device after actuation is detected, where each BLE advertising packet comprises the serial number of the first media playback device;
    receiving at least one BLE advertising packet from the first media playback device at the mobile device;
    determining if the mobile device already has set up the serial number of the first media playback device and displaying a prompt on the graphical user interface for selecting the first media playback device to be set up when the mobile device has not already set up the serial number of the first media playback device;
    connecting the mobile device to the first media playback device using BLE;
    obtaining and verifying a player identifier (ID) from the first media playback device by the mobile device;
    determining that the player ID is valid and certain security measures are met;
    scanning for available wireless networks and displaying a list of the available wireless networks including the local area network (LAN) on the graphical user interface on the mobile device;
    capturing selection of the LAN on the graphical user interface on the mobile device, prompting for a password for the LAN, configuring the first media playback device for connection to the LAN using the BLE connection from the mobile device, and proceeding upon successful connection of the first media playback device to the LAN;
    when the first media playback device is not a portable device, capturing selection of an option for speaker configuration for the media playback device selected on the graphical user interface on the mobile device;
    displaying a screen indicating that the first media playback device configuration is complete on the graphical user interface on the mobile device.

2. The method of claim 1, further comprising display a prompt on the graphical user interface requesting the first media playback device be connected to a power source before the displaying a prompt on the graphical user interface on the mobile device for a user to press a connect button the first media playback device.

3. The method of claim 1, wherein receiving at least one BLE advertising packet from the first media playback device at the mobile device further comprises:
    receiving a plurality of BLE advertising packets from different media playback devices;
    displaying choices of the different media playback devices on the graphical user interface; and
    capturing the selection of the first media playback device from among the displayed choices via the graphical user interface.

4. The method of claim 1, wherein detecting a media playback device further comprises determining that the media playback device is not already connected to the LAN.

5. The method of claim 1, wherein displaying a prompt on the graphical user interface for selecting the first media playback device to be set up when the mobile device has not already set up the serial number of the first media playback device further comprises displaying a plurality of detected compatible BLE devices on the graphical user interface and capturing the selection of one of the plurality of detected compatible BLE devices as indicative of the first media playback device.

6. The method of claim 1, further comprising, when the first media playback device is a portable device, determining if the first media playback device is connected with an ethernet cable and displaying a choice on the graphical user interface whether to continue with ethernet connection.

7. The method of claim 1, wherein each BLE advertising packet further comprises the player identifier (ID) of the first media playback device.

8. The method of claim 1, wherein capturing selection of an option for speaker configuration selected on the graphical user interface on the mobile device comprises capturing selection of an option for a room name to assign to the first media playback device.

9. The method of claim 1, wherein capturing selection of an option for speaker configuration selected on the graphical user interface on the mobile device comprises:

capturing selection of an option as a left-right stereo pair; and configuring the first media playback device as one speaker in a stereo pair with a second media playback device as another speaker in the stereo pair, where the first and second media playback devices are each connected to the LAN.

10. The method of claim 1, further comprising:

determining whether the first media playback device is compatible with one of a plurality of versions of mobile controller application using the player ID using the mobile device; and when the determined compatible mobile controller application is a first version, detecting that a connect button is pressed on the first media playback device, and showing a confirmation prompt on the graphical user interface of the mobile device.

* * * * *